US012690605B2

(12) United States Patent
Pierce et al.

(10) Patent No.: US 12,690,605 B2
(45) Date of Patent: Jul. 28, 2026

(54) SOLUBLE DIETARY FIBER AND METHODS OF MAKING AND USE THEREOF

(71) Applicant: Tate & Lyle Solutions USA LLC, Hoffman Estates, IL (US)

(72) Inventors: Brian Pierce, Hoffman Estates, IL (US); Mervyn De Souza, Hoffman Estates, IL (US); Leslie Kleiner, Hoffman Estates, IL (US); Bart Moyson, Ghent (BE)

(73) Assignee: Tate & Lyle Solutions USA LLC, Hoffman Estates, IL (US)

( * ) Notice: Subject to any disclaimer, the term of this patent is extended or adjusted under 35 U.S.C. 154(b) by 754 days.

(21) Appl. No.: 17/771,744

(22) PCT Filed: Oct. 23, 2020

(86) PCT No.: PCT/US2020/057022
§ 371 (c)(1),
(2) Date: Apr. 25, 2022

(87) PCT Pub. No.: WO2021/081305
PCT Pub. Date: Apr. 29, 2021

(65) Prior Publication Data
US 2022/0378076 A1     Dec. 1, 2022

Related U.S. Application Data

(60) Provisional application No. 62/987,742, filed on Mar. 10, 2020, provisional application No. 62/926,315, filed on Oct. 25, 2019.

(51) Int. Cl.
*A23L 33/21*     (2016.01)
*A23G 1/48*     (2006.01)
(Continued)

(52) U.S. Cl.
CPC ................ *A23L 33/21* (2016.08); *A23G 1/48* (2013.01); *A23G 3/48* (2013.01); *A23L 2/52* (2013.01)

(58) Field of Classification Search
None
See application file for complete search history.

(56) References Cited

U.S. PATENT DOCUMENTS 4,382,963 A     5/1983   Klose et al.
5,620,873 A     4/1997   Ohkuma et al.
(Continued)

FOREIGN PATENT DOCUMENTS

CA       2630621 C     2/2015
CN     107495159 A     12/2017
(Continued)

OTHER PUBLICATIONS

Soni, Gras Notification for Fructooligosaccharides, Soni & Associates Inc, Jan. 7, 2016 <https://www.fda.gov/media/116858/download> (Year: 2016).*
(Continued)

*Primary Examiner* — Erik Kashnikow
*Assistant Examiner* — Thanh H Nguyen
(74) *Attorney, Agent, or Firm* — McDonnell Boehnen Hulbert & Berghoff LLP

(57)     ABSTRACT

The present disclosure relates generally to a soluble dietary fiber, and related methods and products. The soluble dietary fiber possesses enhanced properties relative to conventional soluble dietary fibers, including a small median particle size and narrow particle size distribution.

19 Claims, 13 Drawing Sheets

(51) Int. Cl.
    *A23G 3/48*         (2006.01)
    *A23L 2/52*         (2006.01)

(56)         References Cited

U.S. PATENT DOCUMENTS

| | | | |
|---|---|---|---|
| 7,819,977 | B2 | 10/2010 | Vanhoutte et al. |
| 7,910,150 | B2 | 3/2011 | Matsuda et al. |
| 8,193,341 | B2 | 6/2012 | Meuser et al. |
| 9,234,049 | B2 | 1/2016 | Boit et al. |
| 9,637,767 | B2 | 5/2017 | Ramsden et al. |
| 9,868,969 | B2 | 1/2018 | Harrison et al. |
| 9,957,537 | B2 | 5/2018 | Harrison et al. |
| 9,963,726 | B2 | 5/2018 | Harrison et al. |
| 10,344,308 | B2 | 7/2019 | Harrison et al. |
| 11,104,970 | B2 | 8/2021 | Wu et al. |
| 11,278,585 | B2 | 3/2022 | Zhang et al. |
| 2009/0202705 | A1 | 8/2009 | Meuser et al. |
| 2012/0034366 | A1 | 2/2012 | Hoffman et al. |
| 2013/0040034 | A1 | 2/2013 | Matsubara et al. |
| 2014/0193562 | A1 | 7/2014 | Popplewell et al. |
| 2018/0000145 | A1* | 1/2018 | Geremia ............... A21D 2/181 |
| 2018/0037599 | A1 | 2/2018 | Duflot et al. |
| 2021/0092973 | A1 | 4/2021 | Behringer et al. |
| 2021/0186061 | A1 | 6/2021 | Dupas-Langlet et al. |
| 2021/0368810 | A1 | 12/2021 | Dionisi et al. |

FOREIGN PATENT DOCUMENTS

| | | | |
|---|---|---|---|
| EP | 0423939 | A1 | 4/1991 |
| EP | 1714562 | A1 | 10/2006 |
| FR | 2815824 | A1 | 5/2022 |
| JP | H04179459 | A | 6/1992 |
| JP | H11236401 | A | 8/1999 |
| JP | 2000037169 | A | 2/2000 |
| JP | 2015198582 | A | 11/2015 |
| JP | 2019017354 | A | 2/2019 |
| WO | 93/05663 | A1 | 4/1993 |
| WO | 2001/45858 | A1 | 6/2001 |
| WO | 2003/090893 | A1 | 11/2003 |
| WO | 2005/079595 | A1 | 9/2005 |
| WO | 2016097069 | A1 | 6/2016 |
| WO | 2017/037620 | A1 | 3/2017 |
| WO | 2017/167966 | A1 | 10/2017 |
| WO | 2018/224543 | A1 | 12/2018 |
| WO | 2019/080848 | A1 | 5/2019 |
| WO | 2019105883 | A1 | 6/2019 |
| WO | 2019239366 | A1 | 12/2019 |
| WO | 2020025295 | A1 | 2/2020 |

OTHER PUBLICATIONS

Grundy et al, Solubilisation of Mixed Linkage (1→3), (1→4)β-D-glucans From Barley: Effects of Cooking and Digestion, Journal of Cereal Science, vol. 25, Issue 3, 1997, (Year: 1997) <https://www.sciencedirect.com/science/article/pii/S0733521096900922>.*

Collar et al. "Assessment of the rheological profile of fibre-enriched bread doughs by response surface methodology." Journal of Food Engineering, vol. 28, 2007, pp. 820-826.

Combined Search and Examination Report of UK Application No. GB2000550.0 mailed Oct. 26, 2020, 11 pages.

Angioloni et al. "Physicochemcial and nutritional properties of reduced-caloric density high-fibre breads." LWT-Food Science and Technology, vol. 44, No. 3, 2011, pp. 747-758.

International Search Report and Written Opinion of International Application No. PCT/US2020/057022 mailed Feb. 5, 2021, 11 pages.

Han, Zhongqi et al. "Dictionary of Powder Technology" 1999, vol(3) p. 312. ISBN 7-5629-1296-3.

Voorhees, Rob. "How to operate an air classifier mill to meet your fine grinding goals." PBE. Jun. 2013, 5 pages.

Konar, N. et al. "Using polydextrose as a prebiotic substance in milk chocolate: effects of process parameters on physical and rheological properties." CyTA Journal of Food, 2014, vol. 12, No. 12, pp. 150-159.

Pai, D.A., et al. "Resistant maltodextrin as a shell material for encapsulation of naringin: Production and physicochemical characterization." Journal of Food Engineering, 2015, vol. 161, No. 68-74; 38 pages.

Ronkart et al. "Characterization of Physical State of Spary-Dried Inulin." Food Biophysics. 2007, vol. 2, No. 2-3, pp. 83-92.

"Promitor (R) Soluble Dietary Fiber" Brochure, Tate & Lyle, 2021. 1 page.

"Product Catalog," KOYO Mercantile, Apr. 2025, from www.koyojapan.jp. Provided with Machine Translation. 40 pages.

Beppu et al. "Preparation of Particles for Dry Powder Inhalation Using Novel 4-Fluid Nozzle Spray-Drier," Pharmaceutics, 2003, vol. 63(4), pp. 228-237. Provided with English Abstract.

* cited by examiner

SOLUBLE DIETARY FIBER AND METHODS OF MAKING AND USE THEREOF

CROSS-REFERENCE TO RELATED APPLICATIONS

This application is a U.S. National Stage Application of International Patent Application no. PCT/US2020/057022, which claims the benefit of U.S. Provisional Patent Applications Nos. 62/926,315, filed Oct. 25, 2019, and 62/987, 742, filed Mar. 10, 2020, each of which is hereby incorporated herein by reference in its entirety.

BACKGROUND OF THE DISCLOSURE

1. Field of the Disclosure

The present disclosure relates generally to dietary fiber and products made thereof. More particularly, the present disclosure relates to soluble dietary fibers having desirable morphological, physical and chemical properties, and to methods relating to them, including methods for making and using them.

2. Technical Background

A variety of carbohydrates are used in food products, such as various sugars, starches, and fibers. Many of these carbohydrates are digested in the human stomach and small intestine. Dietary fiber in food products, in contrast, is generally not digested in the stomach or small intestine. Accordingly, dietary fiber, and especially soluble dietary fiber, is of interest as an edible product and component in other food products in order to enhance dietary fiber content or reduce the sugar and caloric content of the food. Both of these modifications are believed to have certain health benefits.

Of particular interest is food product reformulation towards sugar reduction. Soluble dietary fibers are a desirable and suitable substitute for sugar as they provide bulking, are less caloric than sucrose, and provide functionality in some cases. However, soluble dietary fibers often have high residual moisture contents that can cause undesirable changes to food compositions and interact unfavorably with high-fat formulations, such as in some confectionary. Further, the human tongue can detect particles greater than 30 μm in diameter, with final formulations comprising larger particles having undesirable mouthfeel; this is especially problematic in high-fat/low-water systems, in which soluble dietary fibers tend to be insoluble.

As such, there is a need for soluble dietary fibers that have reduced particle size, perceivable sweetness, and low moisture content in order to be suitable food products, food additives, or sugar substitutes.

SUMMARY OF THE DISCLOSURE

One aspect of the disclosure is a soluble dietary fiber in particulate form, having a d10 of no more than 40 μm (e.g., in the range of 1 μm to 40 μm), a d50 in the range of 5 μm to 110 μm, and a d90 in the range of 20 μm to 200 μm. In certain embodiments of the disclosure, the soluble dietary fiber in particulate form has a d10 of no more than 35 μm (e.g., in the range of 1 to 35 μm), a d50 in the range of 5 μm to 100 μm, and a d90 in the range of 20 μm to 175 μm. In certain embodiments of the disclosure, the soluble dietary fiber in particulate form has a d10 of no more than 30 μm (e.g., in the range of 1 μm to 30 μm), a d50 in the range of 5 μm to 95 μm, and a d90 in the range of 20 μm to 160 μm.

Another aspect of the disclosure is a method for making the soluble dietary fiber, the method comprising:

providing an aqueous solution of a soluble dietary fiber feed, and drying the aqueous solution to provide the soluble dietary fiber in particulate form. For example, in certain embodiments, the drying is a spray drying (e.g., including steam-assisted atomization).

Another aspect of the disclosure is a method for making a soluble dietary fiber in particulate form as described herein. The method includes providing a soluble dietary fiber feed, and processing the soluble dietary fiber feed using a technique selected from air-classifying milling, jet milling (e.g., fluidized bed jet milling), ball milling and sphere micronization to provide the soluble dietary fiber in particulate form.

Another aspect of the disclosure is a method for making a food product, the method comprising:

providing a soluble dietary fiber, and combining the soluble dietary fiber with one or more other food ingredients.

Another aspect of the disclosure is a food product comprising a soluble dietary fiber as described herein.

Additional aspects of the disclosure will be evident from the disclosure herein.

DETAILED DESCRIPTION

Figure 1:
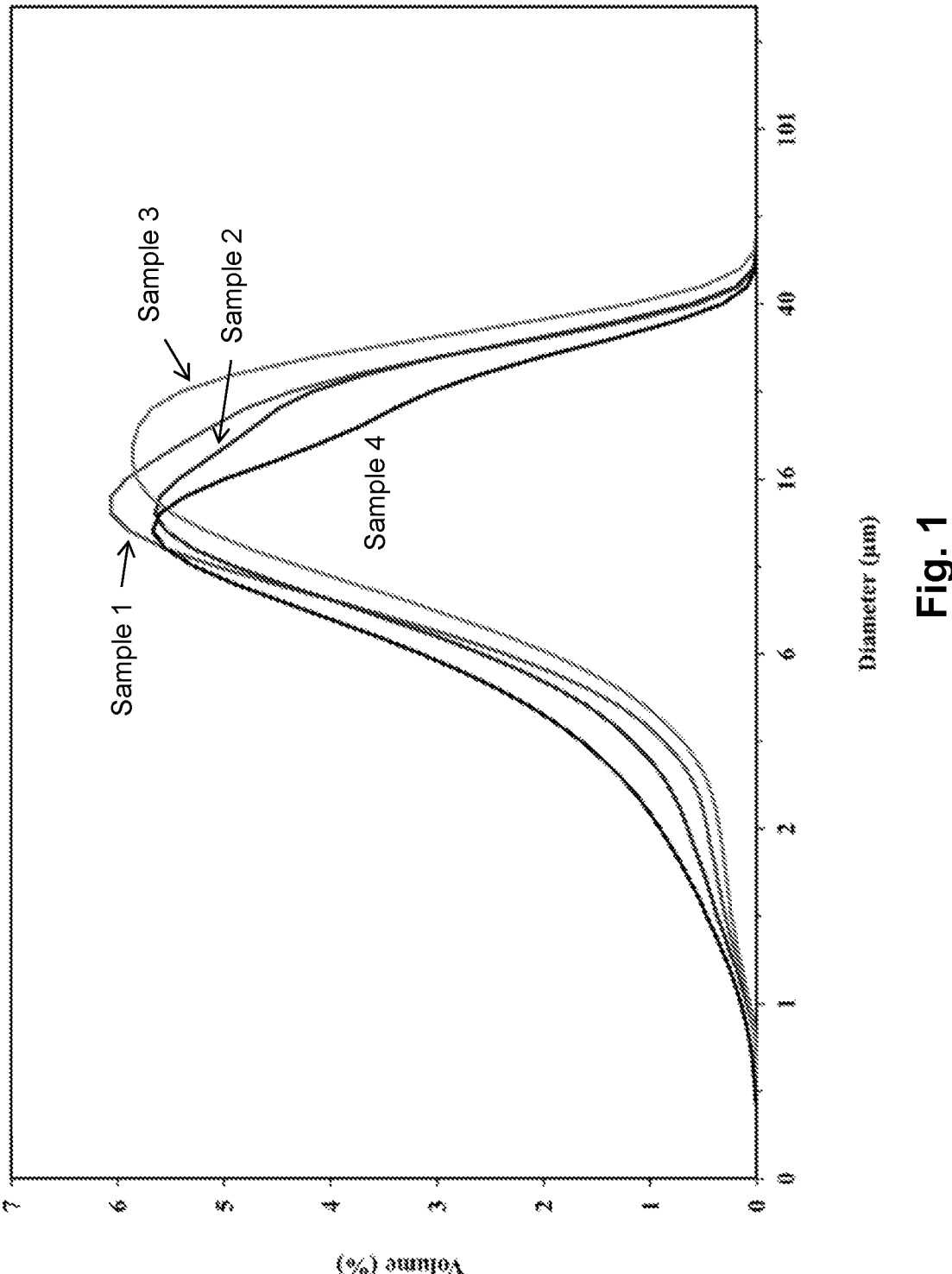
FIG. 1 is a graph depicting the measured particle size distribution for the soluble dietary fibers described in Example 2.

Certain properties of soluble dietary fibers, and thereby their utility in various food and non-food applications, depend strongly on fiber morphology. The present inventors have determined that the precise control of morphology is key to achieving several novel properties. The present inventors have developed certain particulate soluble dietary fibers having a relatively small particle size and a relatively narrow particle size distribution that provide significant advantages (i.e., increased smoothness and enhanced mouth-feel) in food formulations such as fat-based confectionaries (e.g., chocolate) and cream fillings. They also provide significant advantages in beverage powders and other dry mixes, in that they can be dispersed especially easily therein.

The present inventors have noted that soluble dietary fibers are a desirable and suitable substitution for sugar in chocolate, since they provide bulking, are less caloric than sucrose, and provide some of the other functionality desirable in the material. However, many soluble dietary fibers are fundamentally different from sucrose (a crystalline material) in that they are amorphous (e.g., glassy at room temperature). This difference affects various parameters in the chocolate making process, for example, the amount of total moisture in the formulation; the refining process; and the conching process.

Chocolate can be thought of a dispersion of other ingredients (e.g., for milk chocolate, milk solids and cocoa) in fat. Moisture is detrimental to chocolate production, and it is generally understood to those skilled in the art, that it is desirable to maintain a moisture content of no more than 1.5 wt % water in the final product. Moisture changes the rheological parameters of chocolate (viscosity and yield value), and ultimately contributes to shelf life instability (bloom). Typically, moisture from the ingredients in the composition is driven off by the conching process, although a small amount of moisture can be stabilized by emulsifier.

Refining is the process of grinding most of the chocolate mass to a controlled particle size. The mass includes sucrose, but may not include the full fat composition and/or emulsifier and/or flavour composition. The purpose of this process is to unify the particle size of the composition, usually targeting no more than 30 μm for most of the particles (e.g., d90 no more than 30 μm). This particle size is important as it is the threshold at which the human tongue can detect "graininess." Since chocolate is intended to melt in the mouth without graininess, the present inventors noted that particle size of ingredients is of high concern.

Refining relies on the use of a refiner (typically a roller mill), which usually passes the chocolate mass from one roll to another (e.g., through a series of five rollers) in order to grind to the target particle size. The space between the rollers has a strong impact on the particle size of the material. This process generates heat, and the rollers may be cooled with running water to decrease the heat. However, during this process, if the temperature exceeds the glass transition temperature ($T_g$) of a soluble dietary fiber ingredient, the fiber may transition from a glassy and brittle state to the rubbery state, changing the refining behaviour of the fiber and the viscosity of the chocolate mass. Depending on the temperature, particles of soluble dietary fiber may become rubbery enough to fuse together into much larger aggregates, which may force the process to be stopped entirely. Further, heat-induced changes in rheology of the formulation including the soluble dietary fiber ingredient can affect the properties of the chocolate product, affecting variously its ability to be molded, injected or used as an enrobing coating. Because soluble dietary fibers generally have lower $T_g$ than sucrose, rheology changes during the refining process is of higher concern with respect to temperature for soluble dietary fiber than it is with respect to sucrose or other sugars. The present inventors noted that this is especially true for soluble dietary fibers that have a relatively low $T_g$.

"Conching" is the process used primarily to drive residual moisture off, develop flavor, and volatilize certain off-notes.

While there are many conching processes known in the art, they generally involve an extended period of heating and mixing, typically at temperatures in the range of 50° C. to 100° C., e.g., 50° C. to 95° C. In the context of moisture, if the chocolate mass has high moisture content, conching time would increase to reduce the moisture of the mass to the final target level.

In view of the observations above, the present inventors noted a need for a soluble dietary fiber ingredient that could be used for partial or total sucrose replacement in chocolate and similar applications (chocolate, confectionery coatings, ice cream coatings, cream fillings, and others) that provides low moisture content to a formulation; simplifies or even avoids refining of the soluble dietary fiber to reduce its particle size; and does not require a time extension of the conching process in order to provide a desired low moisture content in a final product.

The present inventors have determined that various desirable properties are provided, as described herein, by a soluble dietary fiber in particulate form, having a d10 of no more than 40 μm (e.g., in the range of 1 μm to 40 μm), a d50 in the range of 5 μm to 110 μm, and a d90 in the range of 20 μm to 200 μm. As is conventional in the art, the d10, d50 and d90 values are a measure of the particle size distribution of the particulate soluble dietary fiber. As used herein, these values are determined by laser diffraction and as such are on a volume basis.

In certain embodiments as otherwise described herein, the soluble dietary fiber in particulate form has a d10 of no more than 35 μm (e.g., in the range of 1 μm to 35 μm), a d50 in the range of 5 μm to 100 μm, and a d90 in the range of 20 μm to 175 μm. For example, a soluble dietary fiber according to certain embodiments of the disclosure has a d10 of no more than 30 μm (e.g., in the range of 1 μm to 30 μm), a d50 in the range of 5 μm to 95 μm, and a d90 in the range of 20 μm to 160 μm. In certain embodiments, a soluble dietary fiber as otherwise described herein has a d10 in the range of 15 μm to 35 μm (e.g., 20 μm to 30 μm), a d50 in the range of 60 μm to 95 μm (e.g., 65 μm to 90 μm) and a d90 in the range of 100 μm to 175 μm (e.g., 125 μm to 160 μm). In certain alternative embodiments, a soluble dietary fiber as otherwise described herein has a d10 of no more than 30 μm (e.g., in the range of 1 μm to 30 μm), a d50 in the range of 5 μm to 80 μm, and a d90 in the range of 20 μm to 180 μm, e.g., a d10 of no more than 30 μm (e.g., in the range of 1 μm to 30 μm), a d50 in the range of 5 μm to 60 μm, and a d90 in the range of 20 μm to 100 μm.

The d50 value is the volume median particle size value of the material, i.e., at which 50 vol % of the material has that particle size or smaller. As described above, in certain aspects of the disclosure, the d50 is in the range of 5 μm to 110 μm. For example, in certain embodiments as otherwise described herein, the d50 is in the range of 10 μm to 100 μm, e.g., 10 μm to 75 μm. In certain embodiments as otherwise described herein, the d50 is in the range of 15 μm to 95 μm, e.g., in the range of 16 μm to 40 μm, or alternatively in the range of 40 μm to 70 μm or in the range of 70 μm to 95 μm. In various additional embodiments as otherwise described herein, the d50 is in the range of 5 μm to 100 μm, or 5 μm to 95 μm, or 5 μm to 90 μm, or 5 μm to 70 μm, or 5 μm to 60 μm, or 5 μm to 45 μm, or 5 μm to 30 μm, or 5 μm to 25 μm, or 5 μm to 15 μm, or 8 μm to 100 μm, or 8 μm to 95 μm, or 8 μm to 90 μm, or 8 μm to 80 μm, or 8 μm to 70 μm, or 8 μm to 60 μm, or 8 μm to 45 μm, or 8 μm to 30 μm, or 8 μm to 25 μm, or 8 μm to 15 μm, or 10 μm to 100 μm, or 10 μm to 95 μm, or 10 μm to 90 μm, or 10 μm to 80 μm, or 10 μm to 70 μm, or 10 μm to 60 μm, or 10 μm to 45 μm, or 10

µm to 30 µm, or 10 µm to 25 µm, or 15 µm to 80 µm, or 15 µm to 70 µm, or 15 µm to 60 µm, or 15 µm to 100 µm, or 15 µm to 95 µm, or 15 µm to 90 µm, or 15 µm to 45 µm, or 15 µm to 30 µm, or 15 µm to 25 µm, or 25 µm to 100 µm, or 25 µm to 95 µm, or 25 µm to 90 µm, or 25 µm to 80 µm, or 25 µm to 70 µm, or 25 µm to 60 µm, or 25 µm to 45 µm, or 35 µm to 100 µm, or 35 µm to 95 µm, or 35 µm to 90 µm, or 35 µm to 80 µm, or 35 µm to 70 µm, or 35 µm to 60 µm, or 45 µm to 110 µm, or 45 µm to 100 µm, or 15 µm to 95 µm, or 15 µm to 90 µm, or 45 µm to 80 µm, or 45 µm to 70 µm, or 45 µm to 60 µm, or 55 µm to 110 µm, or 55 µm to 100 µm, or 55 µm to 95 µm, or 55 µm to 90 µm, or 55 µm to 80 µm, or 55 µm to 70 µm or 70 µm to 110 µm, or 70 µm to 100 µm, or 70 µm to 95 µm, or 70 µm to 90 µm.

The d10 value is the particle size value at which 10 vol % of the material has that particle size or smaller. As described above, in certain aspects of the disclosure, the d10 is no more than 40 µm (e.g., in the range of 1 µm to 40 µm). For example, in certain embodiments as otherwise described herein, the d10 is no more than 35 µm, e.g., no more than 30 µm, or no more than 25 µm. in certain embodiments as otherwise described herein, the d10 is no more than 20 µm, or no more than 15 µm, or no more than 10 µm. In certain embodiments as otherwise described herein, the d10 is in the range of 1 µm to 35 µm, or 1 µm to 30 µm, or 2 µm to 26 µm. In certain embodiments as otherwise described herein, the d10 is in the range of 3 µm to 24 µm, or 6 µm to 14 µm, or 14 µm to 30 µm, or 20 µm to 40 µm. In various additional embodiments as otherwise described herein, the d10 is in the range of 1 µm to 20 µm, or 1 µm to 15 µm, or 1 µm to 10 µm, or 1 µm to 5 µm, or 3 µm to 40 µm, or 3 µm to 35 µm, or 3 µm to 30 µm, or 3 µm to 25 µm, or 3 µm to 15 µm, or 3 µm to 10 µm, or 5 µm to 40 µm, or 5 µm to 35 µm, or 5 µm to 30 µm, or 5 µm to 25 µm, or 5 µm to 15 µm, or 5 µm to 10 µm, or 10 µm to 40 µm, or 10 µm to 35 µm, or 10 µm to 30 µm, or 10 µm to 25 µm, or 10 µm to 20 µm, or 15 µm to 40 µm, or 15 µm to 35 µm, or 15 µm to 30 µm, or 15 µm to 30 µm, or 20 µm to 40 µm, or 20 µm to 35 µm, or 20 µm to 30 µm. Of course, the d10 value is no more than the d50 value, and can be, e.g., in the range of 10-80% thereof, e.g., 20-60% thereof.

The d90 value is the particle size value at which 90 vol % of the material has that particle size or smaller. As described above, in certain aspects of the disclosure, the d90 is in the range of 20 µm to 200 µm. For example, in certain embodiments as otherwise described herein, the d90 is in the range of 20 µm to 175 µm, e.g., 20 µm to 160 µm, or 20 µm to 150 µm, or 25 µm to 125 µm. In certain embodiments as otherwise described herein, the d90 is in the range of 20 µm to 35 µm, e.g., 25 µm to 32 µm. In certain embodiments as otherwise described herein, the d90 is in the range of 90 µm to 130 µm, e.g., 100 µm to 120 µm. In various additional embodiments as otherwise described herein, the d90 is in the range of 20 µm to 180 µm, or 20 µm to 160 µm, or 20 µm to 140 µm, or 20 µm to 120 µm, or 20 µm to 100 µm, or 20 µm to 80 µm, or 20 µm to 60 µm, or 20 µm to 40 µm, or 30 µm to 200 µm, or 30 µm to 180 µm, or 30 µm to 160 µm, or 30 µm to 140 µm, or 30 µm to 120 µm, or 30 µm to 100 µm, or 30 µm to 80 µm, or 30 µm to 60 µm, or 50 µm to 200 µm, or 50 µm to 180 µm, or 50 µm to 160 µm, or 50 µm to 140 µm, or 50 µm to 120 µm, or 50 µm to 100 µm, or 50 µm to 80 µm, or 80 µm to 180 µm, or 80 µm to 200 µm, or 80 µm to 180 µm, or 80 µm to 160 µm, or 80 µm to 140 µm, or 80 µm to 120 µm, or 100 µm to 200 µm, or 100 µm to 180 µm, or 100 µm to 160 µm, or 100 µm to 140 µm, or 100 µm to 120 µm, or 120 µm to 200 µm, or 120 µm to 180 µm, or 120 µm to 160 µm. Of course, the d90 value is no less than the d50 value, and can be, e.g., in the range of 120%-1000% thereof, e.g., 170%-500% thereof.

The person of ordinary skill in the art will select desirable particle sizes for the soluble dietary fiber. For example, in certain embodiments, providing a soluble dietary fiber with a d90 no more than 30 µm (or even a d95 no more than 30 µm or a d98 no more than 30 µm) can be introduced into a chocolate formulation without necessarily requiring refining to a smaller particle size. Alternatively, some applications may require introduction of particles of soluble dietary fiber with exceptionally low d90 values, e.g. a d90 of 20 µm or 10 µm, which may be formed by particle size reduction of a soluble dietary fiber with a d90 of about 30 µm, e.g., by refining during production of a chocolate product.

Moreover, d90 values up 180 microns are still much smaller than d90 values of typical soluble dietary fiber particle sizes, especially for soluble dietary fibers having amounts of mono- and disaccharides of at least 10 wt %. When d90 values are in excess of 30 µm, it is possible that some refining is necessary to provide a desirable particle size in certain products, e.g., chocolate products. However, the amount of refining would be less than for larger particle-size material. This can advantageously provide for shorter refining times and a decrease in refining process temperature increase due to friction in the milling process itself, both of which can provide relatively less damage to other ingredients. Reduced refining requirements can also lead to reduced equipment wear and maintenance cost; reduced hardware requirements for manufacturing; and reduced overall production cost.

Beyond a small median particle size, it is desirable in certain embodiments that a soluble dietary fiber as otherwise described herein has a relatively narrow size distribution. In certain embodiments as otherwise described herein, the d10 value is at least 12.5% of the d50 value. For example, in certain such embodiments, the d10 value is at least 25% of the d50 value, e.g., at least 33% of the d50 value. And in certain embodiments as otherwise described herein, the d90 value is no more than 800% of the d50 value. For example, in certain such embodiments, the d90 value is no more than 400% of the d50 value, e.g., no more than 300% of the d50 value. Such narrow size distributions can provide uniform dispersion when incorporated into food products and thus can reduce the perception of grittiness, leading to enhanced mouthfeel.

A continual challenge in the field of food manufacture is the control of moisture. Starches and dietary fibers tend to be hygroscopic, leading to high moisture contents. And soluble dietary fibers are often commercially provided in the form of aqueous syrups. Removal of moisture through conventional drying techniques can lead to phase transitions or other distortions of the desirable properties. In certain embodiments as otherwise described herein, the soluble dietary fiber in particulate form has a moisture content of no more than 10 wt %. For example, in certain embodiments as otherwise described herein, the soluble dietary fiber in particulate form has a moisture content of no more than 8 wt %, e.g., no more than 6 wt %. Of course, real-world samples will often have a small amount of water. Thus, in certain embodiments a soluble dietary fiber as otherwise described herein has a moisture content of at least 0.5 wt %, e.g., at least 1 wt %, at least 2 wt %, or at least 2.5 wt %. In certain embodiments as otherwise described herein, the soluble dietary fiber has a moisture content in the range of 0.5-10 wt %, e.g., 0.5-8 wt %, or 0.5-6 wt % or 0.5-5 wt %. In certain embodiments as otherwise described herein, the soluble dietary fiber has a moisture content in the range of 1-10 wt %, e.g., 1-8 wt %, or 1-6 wt %, or 1-5 wt %. In certain embodiments as otherwise described herein, the soluble dietary fiber has a moisture content in the range of 2-10 wt %, e.g., 2-8 wt %, or 2-6 wt %, or 2-5 wt %. In certain embodiments as otherwise described herein, the soluble dietary fiber has a moisture content in the range of 2.5-10 wt %, e.g., 2.5-8 wt %, or 2.5-6 wt %, or 2.5-5 wt %. In certain embodiments as otherwise described herein, the soluble dietary fiber has a moisture content in the range of 3-10 wt %, e.g., 3-8 wt %, or 3-6 wt %, or 3-5 wt %. In certain embodiments as otherwise described herein, the soluble dietary fiber has a moisture content in the range of 3.5-10 wt %, e.g., 3.5-8 wt %, or 3.5-6 wt %, or 3.5-5 wt %. In certain embodiments as otherwise described herein, the soluble dietary fiber has a moisture content in the range of 4-10 wt %, e.g., 4-8 wt %, or 4-6 wt %, or 4-5 wt %. Moisture content is determined by comparing measured weights before and after heating in a 105° C. drying oven under reduced pressure of 100 mmHg for four hours.

Another property that affects the performance of soluble dietary fibers is the weight-average molecular weight. Soluble dietary fibers can have a variety of molecular weights (consistent with remaining substantially water-soluble). However, the viscosity of the soluble dietary fiber can depend strongly on molecular weight. In many end uses, a specific viscosity is desired, and so it can be desirable for a soluble dietary fiber to have a relatively low molecular weight in order to reduce the impact of the soluble dietary fiber on the viscosity. As the soluble dietary fiber of the present disclosure may be used as a sugar substitute, and many sugars have low effects on viscosity in solution, a soluble dietary fiber that does not greatly increase viscosity may be desired. In certain embodiments as otherwise described herein, the fiber has a weight average molecular weight in the range of 1000 g/mol to 2500 g/mol. For example, in certain such embodiments, the soluble dietary fiber has a weight average molecular weight in the range of 1000 g/mol to 2000 g/mol. In various additional embodiments as otherwise described herein, the soluble dietary fiber has a weight average molecular weight in the range of 1000 to 2250 g/mol, or 1000 g/mol to 1800 g/mol, or 1000 g/mol to 1600 g/mol, or 1200 to 2500 g/mol, or 1200 to 2250 g/mol, or 1200 g/mol to 2000 g/mol, or 1200 g/mol to 1800 g/mol, or 1200 g/mol to 1600 g/mol, or 1400 to 2500 g/mol, or 1400 to 2250 g/mol, or 1400 g/mol to 2000 g/mol, or 1400 g/mol to 1800 g/mol, or 1600 to 2500 g/mol, or 1600 to 2250 g/mol, or 1600 g/mol to 2000 g/mol, or 1800 g/mol to 2500 g/mol, or 1800 to 2250 g/mol, or 2000 g/mol to 2500 g/mol. As used herein, molecular weights of soluble dietary fibers are weight-average molecular weights determined by Gel Permeation Chromatography, using narrow standard pullulans as standards (see Example 1).

Glass transition temperature is the temperature at which a material undergoes a phase change to a so-called "rubbery" phase from a harder phase (typically an amorphous glassy phase). Soluble dietary fibers at low moisture levels are typically glassy solids at room temperature, but have a glass transition that can be in the range of typical food processing temperatures. The temperature at which soluble dietary fiber material undergoes a glass transition depends on a variety of factors, including molecular structure (e.g., for a soluble dietary fiber, the linkage pattern), molecular weight, moisture content, and the relative amount of lower molecular weight materials that can act as plasticizers. In certain embodiments as otherwise described herein, the soluble dietary fiber has a glass transition temperature in the range of 50° C. to 100° C. when measured at 95% solids. As used herein, the glass transition temperature of the soluble dietary fiber is measured using differential scanning calorimetry. For example, in certain embodiments as otherwise described herein, the soluble dietary fiber has a glass transition temperature in the range of 55° C. to 100° C., e.g., 60° C. to 100° C., or 65° C. to 100° C., when measured at 95% solids. In certain embodiments as otherwise described herein, the soluble dietary fiber has a glass transition temperature in the range of 50° C. to 95° C., e.g., 55° C. to 95° C., or 60° C. to 95° C., or 65° C. to 95° C., when measured at 95% solids. In certain embodiments as otherwise described herein (e.g., in embodiments having relatively high amounts of mono- and disaccharide, such as 10-25 wt %), the soluble dietary fiber has a glass transition temperature in the range of 50° C. to 90° C., or 55° C. to 90° C., or 60° C. to 90° C., or 65° C. to 90° C. when measured at 95% solids. And in certain embodiments as otherwise described herein (e.g., in embodiments having relatively high amounts of mono- and disaccharide, such as 10-25 wt %), the soluble dietary fiber has a glass transition temperature in the range of 50° C. to 85° C., or 55° C. to 85° C., or 60° C. to 85° C., or 65° C. to 85° C. when measured at 95% solids. The glass transition temperature governs the operating temperature the soluble dietary fiber may be subjected to without risking a phase change. Phase change during refining can cause agglomeration or deformation of particles, which can be undesirable in some systems; advantageously, the relatively small particle sizes of the soluble dietary fibers described herein can provide for a relatively lower degree of refining, and as such a relatively lower heat buildup during refining, allowing the temperature of the system to remain below the glass transition temperature of the soluble dietary fiber. Alternatively, it may be desirable in some processes to raise the fiber above the glass transition temperature; in such cases the small particle sizes (and in some embodiments, other features) described herein can allow for relatively less time to be used at elevated temperatures.

As used herein, a soluble dietary fiber is a composition that is formed chiefly of dextrose oligomers (i.e., oligosaccharide content having at least 98% dextrose monomeric residues, and degree of polymerization in the range of 2-30) optionally together with dextrose (i.e., monosaccharide). As used herein, the total amount of dextrose oligomers and dextrose in a soluble dietary fiber is at least 95%, desirably at least 98%. The total amount of oligomeric sugar alcohol residues in the soluble dietary fiber is no more than 2%, e.g., no more than 1% or even no more than 0.5%. Thus, the soluble dietary fiber is not a "polydextrose" as the term is commonly understood.

In certain embodiments as otherwise described herein, the soluble dietary fiber comprises certain amounts of mono- and/or disaccharides. This will typically be chiefly dextrose and dextrose disaccharides such as maltose and isomaltose, but the person of ordinary skill in the art will appreciate that minor amounts of other mono- and/or disaccharides may be present. In certain embodiments as otherwise described herein, the total amount of mono- and disaccharides is up to 25 wt % on a dry solids basis, e.g., up to 20 wt %. In certain embodiments, a soluble dietary fiber as otherwise described herein can have a relatively lower amount of mono- and disaccharides, e.g., no more than 15 wt %, no more than 10 wt %. Some embodiments have no more than 5 wt % total mono- and disaccharides. In some embodiments, the soluble dietary fiber has no more than 2 wt % total mono- and disaccharides, or even no more than 1 wt % total mono- and disaccharides.

In certain embodiments as otherwise described herein, there is a relatively significant amount of mono- and/or disaccharides in the soluble dietary fiber. For example, in certain embodiments as otherwise described herein, the total amount of mono- and disaccharides is in the range of 10 wt % to 25 wt %. For example, in certain such embodiments, the total amount of mono- and disaccharides is in the range of 10 wt % to 20 wt %, or 12 wt % to 20 wt %, or 15 wt % to 25 wt % on a dry solids basis. The total amount of mono- and disaccharides can serve to modulate, among other factors, the perceived sweetness of the soluble dietary fiber and is an important parameter for the use of soluble dietary fibers in food compositions. Of course, the presence of significant amounts of mono- and/or disaccharides can lead to a relatively lower glass transition temperature, through plasticization of the oligomeric material.

The amounts of mono- and/or disaccharides can be determined using High Performance Anion Exchange with Pulsed Amperometric Detection, (HPAE-PAD), using a suitable instrument (e.g., a Dionex ion chromatograph, DX500) equipped with an electrochemical detector and gradient pump, and suitable analytical and guard columns (e.g., Dionex Carbopac PA1), using gradient delivery of a sodium hydroxide and sodium acetate eluent. Sugars can be detected using a gold electrode with a four-potential waveform. Samples are diluted with water and passed through Amicon Ultra-4 centrifugal filter devices before analysis. The person of ordinary skill in the art can determine response factors for the mono- and disaccharides present, and use these values to quantify the amount of mono- and disaccharides in an eluted sample, then compare that quantified amount with the total solids content of the sample in order to determine a weight percent on a dry solids basis of mono- and disaccharides.

In many embodiments, the mono- and disaccharide content is a result of the condensation process used to make the soluble dietary fiber. For example, monosaccharide can result largely from unreacted dextrose from the process feed. And disaccharide can result largely from condensation of two molecules of dextrose that do not go on to further oligomerize in the reaction time provided. In certain embodiments as otherwise described herein, the amount of disaccharide is in the range of ⅓ to 3 times the amount of monosaccharide (i.e., on a wt/wt basis). For example, in certain embodiments, the amount of disaccharide is in the range of ½ to 2 times the amount of monosaccharide, or in the range of ⅔ to 1.5 times the amount of monosaccharide. In certain desirable embodiments, sugar is not added to a reaction product to provide the soluble dietary fiber.

In certain embodiments as otherwise described herein, the soluble dietary fiber has a linkage pattern comprising:
25-45% terminally-linked glucopyranosyl residues;
10-22% 6-linked glucopyranosyl residues;
13-32% 4-linked glucopyranosyl residues;
2-11% 3-linked glucopyranosyl residues;
3-13% 4,6-linked glucopyranosyl residues;
1-5% 3,6-linked glucopyranosyl residues; and
0.5-4% 2,4-linked glucopyranosyl residues.

In certain embodiments as otherwise described herein, the soluble dietary fiber has a linkage pattern comprising:
29-45% terminally-linked glucopyranosyl residues;
10-22% 6-linked glucopyranosyl residues;
13-27% 4-linked glucopyranosyl residues;
2-11% 3-linked glucopyranosyl residues;
3-13% 4,6-linked glucopyranosyl residues;
1-5% 3,6-linked glucopyranosyl residues; and
0.5-4% 2,4-linked glucopyranosyl residues.

Linkage patterns are determined using the method of York et al., Methods Enzymol. 116, 3-40 (1985), which is hereby incorporated by reference in its entirety. The method proceeds by permethylating the oligosaccharide, followed by quantitative hydrolysis and acetylation. This results in monomeric species that are acetylated where they were bound to other residues in the oligosaccharide, and methylated everywhere else. The mixture of the monomeric species can be analyzed by gas chromatography-mass spectrometry to determine relative amounts of different types of linked monomers. All linkages quantified in this disclosure can be determined using this method.

As used herein, a terminal residue is a residue that has only a single linkage to the rest of the oligosaccharide of which is it is a part. A 1,X-linked residue is one that is linked to the rest of the oligosaccharide of which it is a part at through its 1-position and its X-position (i.e., to two other residues). A 1,X,Y-linked residue is one that it is linked to the rest of the oligosaccharide of which it is a part through its 1-position, its X-position, and its Y-position (i.e., to three other residues). As used herein, the term "oligosaccharide" includes disaccharides, trisaccharides, and oligomers of higher degrees of polymerization up to 30. Linkage percentages are provided as the fraction of the total number of terminally-linked residues, di-linked residues and tri-linked residues.

The soluble dietary fiber materials of the disclosure can have a variety of fiber contents. "Fiber content" as the term is used herein is the amount of fiber by weight on a dry solids basis as measured by AOAC 2001.03. As used herein, a soluble dietary fiber has a fiber content of at least 60%. In certain embodiments as otherwise described herein, the soluble dietary fiber has a fiber content of at least 65%. For example, in certain embodiments, a soluble dietary fiber as otherwise described has a fiber content of at least 70%, e.g., at least 75%, at least 80%, or even at least 85%. In certain embodiments, a soluble dietary fiber as otherwise described herein has a fiber content of at least 90%, e.g., at least 95% or even at least 98%. For example, in various embodiments as otherwise described herein, a soluble dietary fiber has a fiber content in the range of 70% to 100% fiber, e.g., in the range of 70% to 99%, or 70% to 98%, or 70% to 95%, or in the range of 70% to 90%, or 70% to 85%, or 70% to 80%. In other embodiments as otherwise described herein, a soluble dietary fiber has a fiber content in the range of 65 to 85% fiber, e.g., in the range of 65% to 80%, or in the range of 65% to 75%. And in other embodiments as otherwise described herein, a soluble dietary fiber has a fiber content in the range of 85% to 100%, e.g., 85% to 99%, or 85% to 98%, or 85% to 95%.

The soluble dietary fibers of the disclosure can be made in a variety of ways. For example, in certain embodiments, the soluble dietary fiber can be made by a process that includes providing a saccharide feed comprising at least 95% by weight (e.g., at least 97%, at least 98%, or at least 99%) of dextrose and/or dextrose oligomers on a dry solids basis; reacting the saccharide feed in the presence of water and in the substantial absence of sugar alcohols at a total solids concentration of at least 80 wt % and a temperature of at least 120° C. with at least one acid catalyst that accelerates the rate of cleavage and formation of glucosyl bonds for a time sufficient to produce a product composition having a fiber content of at least 60%.

The saccharide feed can be provided by a variety of materials. In certain embodiments, it has a significant content of linear dextrose oligomers, i.e., oligomers in which dextrose residues are bonded only by 1,4-alpha linkages. In certain embodiments as otherwise described herein, the saccharide feed comprising at least 95% by weight (e.g., at least 97%, at least 98%, or at least 99%) of dextrose and/or linear dextrose oligomers on a dry solids basis. Starch hydrolysate can be suitably used as feed compositions, e.g., having dextrose equivalence values in the range of 26-95, e.g., 26-50, 40-70, or 60-95. These can have varying amounts of dextrose, maltose and higher dextrose oligomers. A variety of starch sources are suitable, e.g., corn, rice, wheat, tapioca and potato. Higher purity dextrose (e.g., at least 97%, at least 98% or at least 99%) is also suitable as a feed composition.

The saccharide feed is reacted in the presence of water at a total solids concentration of at least 80%. The use of high solids concentration will drive the reaction towards condensation to build to a desired molecular weight (e.g., as described above) and to provide condensation of dextrose residues with one another. Notably, this condensation can provide a variety of different types of bonds, including non-1,4-alpha glucosyl bonds that are not so easily digested by the human digestive system. However, it is desirable to have some water present to hydrolyze a proportion of existing 1,4-alpha bonds in the feed (e.g., in linear dextrose oligomers). The person of ordinary skill in the art will select a solids content in conjunction with other process conditions to provide a desired soluble dietary fiber. For example, in certain embodiments as otherwise described herein, the reaction is performed at a total solids concentration of at least 85%, or even at least 90%. In various embodiments as otherwise described herein, the reaction is performed at a total solids concentration the range of 80 wt % to 99 wt %, e.g., 85-99 wt %, or 90-99 wt %, or 93-99 wt %, or 80-98 wt %, or 85-98 wt %, or 90-98 wt %, or 93-98 wt %, or 80-96 wt %, or 85-96 wt %, or 90-96 wt %, or 93-96 wt %.

Of course, a saccharide feed can be provided at a relatively lower solids content (e.g., a pumpable syrup at 60-70%), then concentrated under the reaction conditions to the ultimate desired solids content for the reaction. The reaction can be performed while allowing escape of water (e.g., passively by venting or actively under vacuum), to not only concentrate a lower solids feed but also to drive the condensation by removal of water. It can be desirable to add portions of water to maintain the solids content at a desirable level (e.g., 93-98 wt % or any other amount described above) as water is removed from the system.

As condensation will produce water, the reaction can be performed while allowing water to escape the system, e.g., passively through venting the system, or actively using vacuum pumping.

Notably, the reaction is performed in the substantial absence of sugar alcohols, as is consistent with the fact that the soluble dietary fibers of the disclosure are not "polydextrose." As used herein, a "substantial absence of sugar alcohols" means no more than 0.5 wt % of the feed. Desirably, the reaction is performed with no more than trace amounts of sugar alcohol present.

The reaction is performed at a temperature of at least 120° C. The person of ordinary skill in the art will select a solids content in conjunction with other process conditions to provide a desired soluble dietary fiber. For example, in certain embodiments as otherwise described herein, the reaction is performed at a temperature of at least 130° C., at least 140° C., or even at least 149° C. In various embodiments as otherwise described herein, the reaction is performed at a temperature in the range of 120° C. to 190° C., e.g., 120-180° C., or 120-170° C., or 130-190° C., or 130-180° C., or 130-170° C., or 140-190° C., or 140-180° C., or 140-170° C., or 140-190° C., or 140-180° C., or 140-170° C.

A variety of acid catalysts are known to catalyze the formation and hydrolysis of glucosyl bonds. For example, in certain embodiments, the at least one acid catalyst is selected from hydrochloric acid, phosphoric acid and sulfuric acid. In one embodiment, a combination of hydrochloric acid and phosphoric acid is used. Of course, other acid catalysts may also be suitable, e.g., citric acid, acetic acid, malic acid. However, in certain embodiments, no carboxylic acid catalyst is used. In certain embodiments, at least part of the acid catalyst is present from earlier processing (e.g., from the formation of a starch hydrolysate used as feed). The person of ordinary skill in the art will select an amount of acid suitable to provide a desired reaction rate in view of other reaction conditions. For example, in certain embodiments, sufficient acid is present to provide a reaction mixture pH of no more than 4, e.g., no more than 3 or no more than 2.5, such as in the range of 1.0-2.5.

The reaction time will vary depending on reaction conditions, as the person of ordinary skill in the art will appreciate. A wide variety of times can be used. However, in certain embodiments, the reaction time (i.e., time under the recited temperature, acid and solids content conditions) is in the range of 0.1-60 minutes, e.g., 0.1-30 minutes, or 0.1-15 minutes, or 0.1-10 minutes, or 0.5-60 minutes, or 0.5-30 minutes, or 0.5-15 minutes, or 0.5-10 minutes, or 1-60 minutes, or 1-30 minutes, or 1-15 minutes, or 1-10 minutes.

The reaction can be performed in any convenient system, e.g., in a batch reactor, or in a continuous reactor (e.g., a pipe) with continuous flow.

In certain embodiments, the soluble dietary fiber can be made by a process that includes providing a saccharide feed comprising at least 98% (or at least 99%) of dextrose and/or dextrose oligomers on a dry solids basis; reacting the saccharide feed in the presence of water and in the substantial absence of sugar alcohols at a total solids concentration of at least 90 wt % and a temperature of at least 149° C. with at least one acid catalyst that accelerates the rate of cleavage and formation of glucosyl bonds (e.g., at a pH no more than 4, or 1.0-2.5) for a time sufficient to produce a product composition having a fiber content of at least 60% (e.g., 0.1-15 minutes).

As described above, the reaction is performed such that the product composition (i.e., the reaction product) has a fiber content of at least 60%. In certain embodiments, the reaction is performed to provide the product composition with a fiber content that is about the same as that of the soluble dietary fiber (e.g., any value described above with respect to the soluble dietary fiber). However, in other embodiments, the product composition has an intermediate fiber content and a fractionation is performed to improve the fiber content to that of the soluble dietary fiber. Fractionation can be performed, for example, to selectively remove lower molecular weight components (e.g., DP1 (i.e., degree of polymerization of 1), or DP1+DP2, or DP1–DP3) as compared to higher molecular weight components. Membrane filtration or sequential simulated moving bed chromatography, for example, can be used in the fractionation.

Further processing by enzymes can also be used, e.g., before or after any fractionation steps. However, in certain embodiments no processing by enzyme is performed at any point during the reaction or purification sequence.

The person of ordinary skill in the art will appreciate that conventional methodologies can be used for further purifying the product, e.g., decolorization and ion exchange.

Suitable soluble dietary fibers and methods for making them are further described in U.S. Pat. Nos. 9,868,969, 9,957,537, 9,963,726 and 10,344,308, and in U.S. Patent Application Publication no. 2012/0034366, each of which is hereby incorporated herein by reference in its entirety. Suitable such fibers include those sold under the trade name PROMITOR® by Tate & Lyle Ingredients Americas LLC. The person of ordinary skill in the art can further adapt the methods and materials as described herein based on these references.

One particular advantage of certain fibers described herein (e.g., the fibers made as described herein, and/or having the linkage distributions as described herein) is that they can have good digestive tolerance. For example, certain dietary fibers described herein (e.g., those sold under the trade name PROMITOR®) are tolerated much better by human digestive systems than other fibers like inulin and fructooligosaccharides. Accordingly, such dietary fibers can be included in food compositions at higher usage levels than lower digestive-tolerance fibers like inulin and fructooligo-saccharides, as they are much less likely to cause digestive discomfort when eaten in larger quantities.

As described above, the soluble dietary fiber is provided in particulate form. The morphology of the particles is an important factor that can contribute to their ease of handling, dispersion, milling, solubility, and other factors. In certain embodiments as otherwise described herein, the particulate form has a substantially spherical morphology (e.g., as shown in FIGS. 2-5).

The present inventors have determined that the soluble dietary fibers in particulate form described herein can be especially advantageous with respect to their flow properties. Certain soluble dietary fibers currently marketed are provided in a particulate form, but via a chill-belt process, in which molten fiber is spread on a chill belt, chilled to from a solid, then milled. The present inventors have determined that the small particle size, and relatively narrow particle size distributions described herein can provide for improved flow properties over conventional chill belt materials, which may offer benefits for processing and material handling.

In certain embodiments as otherwise described herein, the soluble dietary fiber is in a spray-dried form. As described in detail below, spray drying has been found by the present inventors to be a preferred method of forming soluble dietary fiber in particulate form, particularly having a sub-stantially spherical morphology. Chill belt drying followed by milling can provide particles that are not substantially spherical, e.g., having a more jagged profile. Substantially spherical particles have much better flowability than do non-spherical particles.

In certain desirable embodiments, the particles of the soluble dietary fiber in particulate form are formed substan-tially of the soluble dietary fiber. For example, in certain embodiments as otherwise described herein, the particles of the soluble dietary fiber are made up of at least 90 wt % on a dry solids basis of the soluble dietary fiber on a dry solids basis, e.g., at least 95 wt % or at least 98 wt %.

One potential application of soluble dietary fiber is its use as a sugar replacement to provide bulking and texture attributes while contributing fewer calories to the end prod-uct as compared to sugar, e.g., sucrose, dextrose, fructose (e.g., provided by syrups like corn syrup). Similarly, other sweeteners like sugar alcohols (e.g., maltitol (e.g., provided by maltitol powder or maltitol syrup), erythritol, sorbitol (e.g., provided by sorbitol powder or sorbitol syrup), xylitol, mannitol) can present laxation issues; due to its high diges-tive tolerance, soluble dietary fiber can be used in place of sugar alcohols to provide bulking and texture attributes to the product. In certain desirable embodiments, the soluble dietary fiber can provide some sweetness to the finished product. As such, in certain embodiments as otherwise described herein, the soluble dietary fiber has a perceived sweetness. Of course, in certain embodiments a high inten-sity sweetener (e.g., a stevioside such as rebaudioside A, rebaudioside B, rebaudioside M and mixtures thereof, a mogroside, aspartame, sucralose, saccharin, neotame ace-sulfame K, cyclamate, allulose, monkfruit sweeteners) can be used to provide sweetness lost through omission of sweetener.

In certain embodiments as otherwise described herein, the soluble dietary fiber in particulate form does not include an emulsifier (i.e., less than 0.05 wt %) or a flavoring (i.e., less than 0.05 wt %).

Another aspect of the disclosure is a method for making a soluble dietary fiber as described in the embodiments above. The method includes providing an aqueous solution of a soluble dietary fiber feed (i.e., of any soluble dietary fiber as described above), and drying the aqueous solution to provide the soluble dietary fiber in particulate form. The present inventors have determined especially that spray drying (for example using steam-assisted atomization) can be used to provide particulate soluble dietary fibers having desirable particle sizes and particle size distributions, even when the soluble dietary fiber has a relatively lower glass transition temperature.

Spray drying can be performed using conventional equip-ment. For example, small scale spray drying can be per-formed using laboratory-scale spray driers such as those available from Buchi (Buchi, CH). Larger scale apparatuses include the Anhydro PSD55 spray drying unit equipped with a rotary atomizer and the Niro MOBILE MINOR™, Model MM-I Spray Dryer, as well as industrial-scale dryers of a variety of designs, e.g., configured for single or multi-stage drying. In one specific example, a FILTERMAT® Spray Dryer can be adapted for use in the processes described herein. However, the person of ordinary skill in the art will appreciate that there are a number of industrial-scale spray drying systems that can be adapted for providing spray-dried materials as described herein. Atomization systems and methods are also well-known in the art. Based on the disclosure herein, the person of ordinary skill in the art will select systems and process conditions suitable to provide spray-dried materials having desired particle sizes and par-ticle size distributions as described herein.

For example, in certain embodiments as otherwise described herein, the aqueous solution has a concentration of dissolved solids in the range of 10% to 80%. For example, in various embodiments of the processes as otherwise described herein, the concentration of the dissolved solids in the aqueous solution is in the range of 25% to 75%, or in the range of 30% to 75%, or in the range of 25% to 65%, or in the range of 30% to 65%, or in the range of 50% to 80%, or in the range of 50% to 70%. The present inventors have determined that such concentrations can be especially useful in spray drying soluble dietary fibers. The present inventors note that steam-assisted atomization, as described below, can be especially useful with feeds of higher dissolved solids concentrations.

It is desirable that the temperature of spray drying be carefully controlled. The person of ordinary skill in the art will appreciate that particular spray-drying temperatures will depend on system and process design. For example, in certain embodiments as otherwise described herein, the spray-drying is conducted with an outlet temperature in the range of 60-130° C., e.g., 60-100° C., or 65-100° C., or 75-110° C., or 75-115° C., or 80-120° C., or 85-130° C. In certain embodiments as otherwise described herein, the spray-drying is conducted with an inlet temperature in the range of 125-250° C., e.g., 125-185° C., or 125-160° C., or 130-150° C., or 150-250° C., or 150-225° C., or 150-200° C., or 175-250° C., or 175-225° C., or 200-250° C. Higher temperatures can help to provide drier particulate materials. In certain embodiments, it can be desirable to contact particles as they are drying in flight with cooler dry gas (e.g., dehumidified air) to drop their temperature below the glass transition temperature, to help avoid stickiness and agglomeration.

The person of ordinary skill in the art will, based on the disclosure herein, adapt otherwise conventional spray-drying systems methodologies to spray dry soluble dietary fibers as described herein. For example, dual fluid nozzle, single fluid nozzle, rotary atomizer and steam-assisted atomization techniques can be adapted for the methods and materials as described herein. The present inventors have determined a number of relevant considerations for spray-drying soluble dietary fibers. For example, outlet temperature is one important consideration. It can in some cases be desirable to use a relatively high outlet temperature, in order to maximize quick drying of the particles. Of course, this means that the drying particles will have a higher temperature for a longer time, and so in some cases it can be desirable to cool the drying particles while in flight (e.g., with a dry gas like dehumidified air) in order to prevent stickiness when contacting process equipment or agglomeration when contacting other particles. The outlet temperature can be regulated by a variety of parameters, including inlet temperature, feed solids, air flow, feed and flow rate. The concentration of solids of the sprayed solution is also important. It is desirable to dry at a high enough solids concentration such that the water can be evaporated at a reasonable temperature and residence time. Too much water in the solution can lead to the sprayed particle not drying quickly enough, and therefore being sticky when contacting process equipment or other particles. If there is too little water in the solution, flowability of the sprayed solution may be undesirably low (although this can be ameliorated with steam-assisted atomization). Moreover, the solids concentration also affects particle size; lower solids concentrations lead to smaller particle size. The particle size of the droplets, and therefore of the dried particulates, can be modified by altering nozzle configuration and type of the dryer. The person of ordinary skill in the art will select nozzle size as well as other parameters based on the particular equipment and methodologies used. The person of ordinary skill in the art can balance these considerations along with other considerations conventional in the spray-drying art to provide a desired product.

Conventional spray-drying nozzles (e.g., high-pressure nozzles) can be used to atomize the solution of soluble dietary fiber in the spray-drying processes of the disclosure. However, the inventors also note that steam-assisted atomization can advantageously be used in spray-drying techniques to provide the particulate soluble dietary fibers as described herein. In steam-assisted atomization, the material to be atomized is mixed with steam in a nozzle to provide very finely atomized droplets, and thus provide primary particles of desirably small particle sizes and narrow particle size distribution after drying of the atomized droplets. Particles made by steam-assisted atomization can advantageously have a high sphericity, through avoidance of air inclusion and by retarding drying during droplet formation.

Steam-assisted atomization can be advantaged in that relatively higher solids feeds can be used while still providing the desired particle size and distribution. Conventional systems can be adapted to provide small particle sizes and narrow size distributions, e.g., by adapting the lance and the hot air inlet throat; for example, the lance can be made larger to allow for steam to be provided to the nozzle. The techniques described in International Patent Application Publications nos. 2005/079595, 03/090,893 and 01/45858, each of which is hereby incorporated by reference in its entirety, can be adapted to provide particulate soluble dietary fibers as described herein.

While particles made by steam-assisted atomization can be agglomerated into secondary particles, in many cases it will be desirable for the person of ordinary skill in the art to operate the process to avoid substantial agglomeration.

While spray drying can advantageously be used to make the soluble dietary fibers in particulate form as described herein, the inventors note that other methods can be used. For example, while many milling methods are not suitable for milling soluble dietary fibers described herein to desirably small size, the inventors note that there are milling methods that can be suitable, e.g., air-classifying milling, jet milling (e.g., fluidized bed jet milling) and ball milling. The person of ordinary skill in the art will adapt these techniques to provide the particulate soluble dietary fibers described herein, e.g., using low temperatures.

Accordingly, another aspect of the disclosure is a method for making a soluble dietary fiber in particulate form as described herein. The method includes providing a soluble dietary fiber feed in solid form, and processing the soluble dietary fiber feed using a technique selected from air-classifying milling, jet milling (e.g., fluidized bed jet milling), ball milling and sphere micronization to provide the soluble dietary fiber in particulate form.

A solid soluble dietary fiber can be produced through evaporation of a liquid soluble dietary fiber (e.g., to any desired moisture level as described herein), followed by cooling to provide a high-solid material, e.g., in the form of a glass. A cooled belt (e.g., water- or air-cooled) can advantageously be used. The milling and micronization techniques referenced above can convert the bulk solid material to particulate material of a desired particle size distribution and moisture level as otherwise described herein.

The person of ordinary skill in the art will appreciate that other methods for forming substantially spherical particles at micron-scale, e.g., used in the pharmaceutical industry, can also be used.

Another aspect of the disclosure is a soluble dietary fiber made by a method as described herein.

Another aspect of the disclosure is a method for making a food product. The method includes providing a soluble dietary fiber, and combining the soluble dietary fiber with one or more other food ingredients. Another aspect of the disclosure is a food product that is made by such a method.

Another aspect of the disclosure is a food product comprising a soluble dietary fiber as described herein. Such a food product can be made by a method as described herein.

In certain embodiments as otherwise described herein, the soluble dietary fiber is disposed in a phase of the food product having no more than 3.5 wt % water, e.g., no more than 3.0 wt % water, or no more than 2.5 wt % water. For example, in certain such embodiments, the soluble dietary fiber is disposed in a phase of the food product having no more than 2 wt % water, e.g., no more than 1.5 wt % water. Notably, when the soluble dietary fiber is disposed in the phase of a food product having relatively little water, it will tend not to dissolve or aggregate. Accordingly, the small particle size and narrow particle size distribution as described herein can provide for a low degree of perceived grittiness and an excellent mouthfeel, e.g., while fulfilling other desired functions (e.g., sugar replacement, provision of desirable texture).

Similarly, in certain embodiments as otherwise described herein, the soluble dietary fiber is disposed in a food product having no more than 3.5 wt % water, e.g., no more than 3.0 wt % water, or no more than 2.5 wt % water. For example, in certain such embodiments, the soluble dietary fiber is disposed in food product having no more than 2 wt % water, e.g., no more than 1.5 wt % water.

In certain embodiments of the methods and food products as otherwise described herein, the soluble dietary fiber is not dissolved in the food product. For example, the fiber may be dispersed in a lipid phase of a food matrix. Examples of food products that include lipid phases include chocolate, confectionary coatings, cream fillings, and the like. Here, too, the small particle size and narrow particle size distribution as described herein can provide for a low degree of perceived grittiness and an excellent mouthfeel, e.g., while fulfilling other desired functions (e.g., sugar replacement, provision of desirable texture).

In certain embodiments (e.g., when the d90 is no more than 30 microns), the soluble dietary fiber is incorporated in the food product without substantial particle size reduction. However, in other embodiments (e.g., when the d90 is in excess of 30 microns), the soluble dietary fiber is incorporated in the food product with a substantial particle size reduction. In such embodiments, relatively less particle size reduction may be necessary than when using conventional larger particle size materials. For example, as described above, when used in a chocolate composition, relatively less refining may be necessary than when using a larger particle size material, which can provide for relatively less heating and relatively less damage to other ingredients.

In certain embodiments as otherwise described herein, the food product comprises a confectionary composition, e.g., a chocolate composition, in which the soluble dietary fiber is disposed. In certain such embodiments, a method for making such a food product includes combining the soluble dietary fiber (e.g., in an amount of 1-75% by weight) with chocolate ingredients including sweetener (e.g., one or more of sugar and non-sugar sweetener such as those described above), cocoa liquor, cocoa butter, dairy ingredients if applicable, and; refining the combination by milling; then conching the refined combination by mixing and heating. Emulsifier, additional cocoa butter and flavors can be incorporated if desirable. A wide variety of chocolate compositions can be provided, e.g., milk chocolate, bittersweet chocolate, dark chocolate, white chocolate, and flavored chocolate. Such products can include, e.g., amounts of other vegetable fats (such as in the form of so-called cocoa-butter replacers and cocoa butter substitutes). For example, European Union regulations allow for the presence of up to 5%

In another aspect, the food product comprises a confectionery composition, e.g. a confectionery coating, in which sweeteners, cocoa butter or cocoa butter equivalents, cocoa butter replacers or cocoa butter substitutes or other vegetable fats, in any combinations thereof and soluble dietary fiber in a concentration from 1-75% by weight are used, with or without cocoa powder or cocoa liquor, and with or without flavors and/or emulsifiers. When used without cocoa powder or cocoa liquor, such coatings can include other flavors (e.g. yogurt, strawberry, vanilla, white chocolate, mint, peanut butter, or others), and can use an emulsifier to help provide the desired consistency. Accordingly, confectionary coatings of the disclosure can be based on mixtures of fiber, fat, flavoring and emulsifier. Here, too, a wide variety of confectionary coatings can be provided, e.g., chocolate flavored or otherwise flavored.

In certain embodiments, the food product includes a chocolate filling that includes a soluble dietary fiber as described herein. The chocolate filling may be, e.g., disposed within a chocolate shell, or in other examples inside a baked good, such as a cookie, a pastry or a cake.

Another type of food product in which a soluble dietary fiber as described herein can be used is fatty spreads, such as nut-based spreads. Examples include highly sweetened spreads such as sweetened hazelnut spreads (e.g., NUTELLA); milk-based spreads, chocolate-based spreads, and nut-based spreads such as peanut butter, almond butter and cashew butter. In making such spreads, solid ingredients can be mixed with fat then refined; the resulting mixture can be conched or mixed to control textural parameters. The use of soluble dietary fiber as described herein can provide especially beneficial mouthfeel to nut-based spreads, especially where sugar is replaced by a high-intensity sweetener and soluble dietary fiber.

In certain embodiments as otherwise described herein, the food product is a candy, a bar (e.g., energy bar, snack bar, breakfast bar, protein bar), a frozen dessert or a baked good comprising the confectionary composition (e.g., chocolate and/or confectionary coating composition and/or cream filling composition used for the purpose of coating (enrobing) or adding inclusions, e.g., inclusions of chocolate, or adding protection from moisture migration), or other food products that may be enrobed with such chocolate or confectionary coatings (e.g. chocolate nut clusters).

Other suitable food products include, but are not limited to, chewing gum (which includes sugarized gum, sugar-free gum, functional gum and bubble gum), centerfill confections, medicated confectionery, lozenges, tablets, pastilles, mints, standard mints, power mints, chewy candies, hard candies, boiled candies, breath and other oral care films or strips, candy canes, lollipops, gummies, jellies, wine gums, fudge, caramel, hard and soft panned goods, toffee, taffy, liquorice, gelatin candies, gum drops, jelly beans, nougats, fondants.

The present inventors have noted that the small particle size of the soluble dietary fibers described in, owing at least in part to theft small particle size, are conveniently dissolved in water. Accordingly, in certain embodiments as otherwise described herein, the soluble dietary fiber is dispersed in (e.g., dissolved in) an aqueous phase of a food product. The aqueous phase can have, e.g., at least 10% water, at least 20% water, at least 30% water, or at least 50% water. For example, in certain embodiments, the aqueous phase includes 10-99.8% water, or 20-99.8% water, or 30-99.8% water, or 40-99.8% water. Of course, the soluble dietary fibers described herein can be provided in food products of a wide variety of water contents. Examples of such food products include beverages (i.e., which can have a single phase that is aqueous), as well as meal replacements, batters, soups, gravies and sauces. Accordingly, certain embodiments of the disclosure relate to methods for providing such food products, which include providing a soluble dietary fiber having a particle size as described herein, and dissolving it in an aqueous medium. The soluble dietary fiber of the disclosure can be advantageously used in a variety of dry mixes, e.g., dry mixes for beverages, as well as for meal replacements, batters, puddings, soups, gravies and sauces.

Particular dry mixes include powders for beverages such as fruit beverages, protein beverages, meal replacements, milks such as infant formulas and growing-up milks, milk modifiers, batters, puddings, soups, gravies and sauces. The small particle size can assist with dispersion, dissolution of the fiber in an aqueous phase, and downstream and/or upstream homogenization of the mix. A variety of food products having aqueous phases are further described below. The soluble dietary fibers described herein are useful in methods for making such food products and dry mixes therefor.

The person of ordinary skill in the art will appreciate that the soluble dietary fibers described herein can be used in a wide variety of other food products. The food product can be, for example, a meat analogue, bread, cake, cookie, cracker, extruded snack, soup, frozen dessert, fried food, pasta product, potato product, rice product, corn product, wheat product, dairy product, yogurt, confectionary, hard candy, nutritional bar, breakfast cereal, or beverage.

Certain embodiments of the food products as otherwise described herein are selected from meat analogues, baked foods, breakfast cereal, anhydrous coatings (e.g., ice cream compound coating, chocolate), dairy products, confections, jams and jellies, beverages, fillings, extruded and sheeted snacks, gelatin desserts, snack bars, cheese and cheese sauces, edible and water-soluble films, soups, syrups, sauces, dressings, creamers, icings, frostings, glazes, pet food, tortillas, meat and fish, dried fruit, infant and toddler food, and batters and breadings. A soluble dietary fiber as described herein can be present in the food product for one or more purposes, such as a replacement or supplement for conventional carbohydrate, e.g., a complete or partial replacement for sweetener solids, bulking agent for replacement of other solids in the composition, or as a source of dietary fiber. Specific examples of foods in which a soluble dietary fiber as described herein can be used include processed foods such as meat analogues, bread, cakes, cookies, crackers, extruded snacks, soups, frozen desserts, fried foods, pasta products, potato products, rice products, corn products, wheat products, dairy products, yogurts, confectioneries, hard candies, nutritional bars, breakfast cereals, and beverages. A food product containing a soluble dietary fiber as described herein can have a lower caloric content, a lower glycemic response, lower glycemic index, and lower glycemic load than a similar food product in which a conventional carbohydrate, such as corn syrup, is used. Similarly, a food product containing a soluble dietary fiber as described herein can have an increased fiber content as compared to a similar food product in which a conventional carbohydrate, such as corn syrup, is used.

A soluble dietary fiber as described herein can be added to food products as a source of soluble fiber. It can increase the fiber content of food products without having a negative impact on flavor, mouth feel, or texture.

The functionality of a soluble dietary fiber as described herein can be similar to corn syrup and sugar, which makes it suitable for complete or partial replacement of various nutritive sweeteners in food products. For example, a soluble dietary fiber as described herein can be used for total or partial replacement of sucrose, high fructose corn syrup (HFCS), fructose, dextrose, regular corn syrup, corn syrup solids, or other syrups such as tapioca syrup, oat syrup, rice syrup, pea syrup in food products. Soluble dietary fiber as described herein can similarly act as a partial or complete replacement of sugar alcohol sweeteners. At high sweetener solids replacement levels, the sweetness of the food product could be decreased, but mouthfeel and flavor release can remain substantially the same, while sugar and calorie content would be reduced. Also, a soluble dietary fiber as described herein could be used as a bulking agent, replacing fat, flour, or other ingredients in a food formula. Alternatively, a soluble dietary fiber as described herein can be used in food products in combination with sweeteners such as sucrose, HFCS, or fructose, resulting in no change in overall sweetness of the food product. As another example, a soluble dietary fiber as described herein can be used in food products in combination with sucralose or other high intensity sweeteners, which allows sweetener replacement with no change in sweetness or mouthfeel of the food product.

A soluble dietary fiber as described herein can be used in food products in combination with resistant starch, polydextrose, or other fiber sources, to boost the fiber content of the food product, enhance physiological benefit from consumption of the product, reduce the caloric content, and/or enhance the nutritional profile of the product.

A soluble dietary fiber as described herein can be used in food products optionally in combination with bulking agents, such as sugar alcohols or maltodextrins, to reduce caloric content and/or to enhance nutritional profile of the product. A soluble dietary fiber as described herein can also be used as a partial replacement for fat or oil in food products.

A soluble dietary fiber as described herein can be used in food products as a tenderizer or texturizer, to increase crispness or snap, to improve eye appeal, and/or to improve rheology (e.g., of dough, batter, or other food compositions). A soluble dietary fiber as described herein can also be used in food products as a humectant, to increase product shelf life, and/or to produce a softer, moister texture. It can also be used in food products to reduce water activity or to immobilize and manage water. Additional uses of the oligomer composition as described herein include: to replace egg wash and/or to enhance the surface sheen of a food product, to alter flour starch gelatinization temperature, to modify the texture of the product, and to enhance browning of the product. Soluble dietary fibers as used herein can also be used to at least partially replace fat in a food product.

At least in some embodiments of the invention, a soluble dietary fiber as described herein has one or more of the following advantages: high solubility, which makes it relatively easy to incorporate into food compositions, such as batters and doughs; stability under elevated temperatures and/or acidic pH (some other soluble fibers, such as inulin, are not as stable), lower sweetness, clean flavor, and clear color. The properties of a soluble dietary fiber as described herein can allow food products in which it is used to have a clean label.

A soluble dietary fiber as described herein can be used in a variety of types of food products. One type of food product in which a soluble dietary fiber as described herein can be very useful is bakery products (i.e., baked foods), such as cakes, brownies, cookies, cookie crisps, muffins, breads, and sweet doughs. Conventional bakery products can be relatively high in sugar and high in total carbohydrates. The use of a soluble dietary fiber as described herein as an ingredient in bakery products can help lower the sugar and carbohydrate levels, as well as reduce the total calories, while increasing the fiber content of the bakery product.

There are two main categories of bakery products: yeast-raised and chemically-leavened. In yeast-raised products, like donuts, sweet doughs, and breads, a soluble dietary fiber as described herein can be used to replace sugars, but a small amount of sugar may still be desired due to the need for a fermentation substrate for the yeast or for crust browning. A soluble dietary fiber as described herein in solid form could be added in a manner similar to nutritive dry sweeteners, with other dry ingredients, and would require no special handling. A soluble dietary fiber as described herein can be added with other liquids as a direct replacement for syrups or liquid sweeteners. The dough would then be processed under conditions commonly used in the baking industry including being mixed, fermented, divided, formed or extruded into loaves or shapes, proofed, and baked or fried. The product can be baked or fried using conditions similar to traditional products. Breads are commonly baked at temperatures ranging from 420° F. to 520° F. for 20 to 23 minutes and doughnuts can be fried at temperatures ranging from 400-415° F., although other temperatures and times could also be used. High intensity sweeteners can be added to doughs as required to obtain optimum sweetness and flavor profile.

Chemically leavened products typically have more sugar and may contain a higher level of a soluble dietary fiber as described herein. A finished cookie can contain 30% sugar, which could be replaced, entirely or partially, with a soluble dietary fiber as described herein. These products could have a pH of 4-9.5, for example. The moisture content can be between 2-40%, for example.

A soluble dietary fiber as described herein is readily incorporated and may be added to the fat at the beginning of mixing during a creaming step or in any method similar to the syrup or dry sweetener that it is being used to replace. The product would be mixed and then formed, for example by being sheeted, rotary cut, wire cut, or through another forming process. The products would then be baked under typical baking conditions, for example at 200-450° F.

A soluble dietary fiber as described herein can also be used to form sugar glasses in the amorphous state, to adhere particles to baked goods, and/or used to form a film or coating which enhances the appearance of a baked good. A soluble dietary fiber as described herein in solid form, like other amorphous sugars, form glasses with heating and subsequent cooling to a temperature below their glass transition temperature.

Another type of food product in which a soluble dietary fiber as described herein can be used is breakfast cereal. For example, a soluble dietary fiber as described herein could be used to replace all or part of the sugar in extruded cereal pieces and/or in the coating on the outside of those pieces. The coating is typically 30-60% of the total weight of the finished cereal piece. A soluble dietary fiber as described herein can be applied in a spray or drizzled on, for example. The formula for the coating can be as simple as a 75% solution of a soluble dietary fiber as described herein. A soluble dietary fiber as described herein could also be blended with sugar at various percentages, or with other sweeteners or polyols. The extra moisture could then be evaporated in a low heat oven. In an extruded piece, a soluble dietary fiber as described herein in solid form could be added directly with the dry ingredients, or a soluble dietary fiber as described herein in syrup form could be metered into the extruder with water or separately. A small amount of water could be added in the extruder, and then it could pass through various zones ranging from 100° F. to 300° F. Optionally, other sources of fiber such as resistant starch can be used in the extruded piece. Using a soluble dietary fiber as described herein would create a different texture than other fiber sources. Using it alone or in combination with other fibers may alter the texture to create product diversity.

Another type of food product in which a soluble dietary fiber as described herein can be used is dairy products or dairy alternatives. Examples of dairy products and dairy alternatives in which it can be used include yogurt, yogurt drinks, milk drinks, flavored milks, plant-based milk alternatives such as nut-based milk alternatives and oat-based milk alternatives, smoothies, ice cream, shakes, cottage cheese, cottage cheese dressing, and dairy desserts, such as quarg and the whipped mousse-type products. This would include dairy products that are intended to be consumed directly (e.g., packaged smoothies) as well as those that are intended to be blended with other ingredients (e.g., blended smoothie). It can be used in pasteurized dairy products, such as ones that are pasteurized at a temperature from 160° F. to 285° F. Complete replacement of sugars in a dairy product is possible (which would be up to 24% of the total formula). The soluble dietary fiber as described herein is generally stable at acid pH values (the pH range of dairy beverages typically would be 2-8). The soluble fibers described herein can also be useful in a fruit preparation (e.g., a sauce or a topping) that accompanies a dairy product such as a yogurt or yogurt alternative.

Another type of food product in which a soluble dietary fiber as described herein can be used is confections. Examples of confections in which it can be used include hard candies, fondants, nougats and marshmallows, gelatin jelly candies or gummies, jellies, wine gums, chocolate, confectionery coating, licorice, chewing gum, caramels and toffees, chews, mints, tableted confections, hard-panned and soft panned products, and fruit snacks. In fruit snacks, a soluble dietary fiber as described herein could be used in combination with fruit juice. The fruit juice would provide the majority of the sweetness, and the soluble dietary fiber as described herein would reduce the total sugar content and add fiber. The syrup can be added to the initial candy slurry and heated to the finished solids content. The slurry could be heated from 200-305° F. to achieve the finished solids content. Acid could be added before or after heating to give a finished pH of 2-7. A soluble dietary fiber as described herein could be used as a replacement for 0-100% of the sugar and 1-100% of the corn syrup or other sweeteners present (e.g., tapioca syrup, oat syrup, rice syrup, pea syrup, sugar alcohols) present.

Another type of food product in which a soluble dietary fiber as described herein can be used is jams and jellies. Jams and jellies are made from fruit. A jam contains fruit pieces, while jelly is made from fruit juice. A soluble dietary fiber as described herein can be used in place of sugar or other sweeteners (e.g., sugar alcohols or syrups such as corn syrup, tapioca syrup, oat syrup, rice syrup, pea syrup) as follows: Weigh fruit and juice into a tank. Premix sugar, resistant corn syrup and pectin. Add the dry composition to the liquid and cook to a temperature of 214-220° F. Hot fill into jars and retort for 5-30 minutes.

Another type of food product in which a soluble dietary fiber as described herein can be used is beverages. Examples of beverages in which it can be used include carbonated beverages, fruit beverages such as fruit juices, concentrated juice mixes (e.g., margarita mix), clear waters, ready-to-drink beverages, meal replacements, protein beverages, and milks such as infant formulas and growing-up milks. And as described above, the soluble dietary fibers described herein are useful in beverage dry mixes. The use of a soluble dietary fiber as described herein can in many cases overcome the clarity problems that result when other types of fiber are added to beverages. A complete replacement of sugars is possible (which could be, for example, up to 12% of the total formula). Because of the stability of the soluble dietary fiber as described herein at acid pH, it could be used in beverages having pH ranging from 2-7, for example. A soluble dietary fiber as described herein could be used in cold processed beverages and in pasteurized beverages. As described above with respect to dry mixes, the small particle size can assist with dispersion, dissolution of the fiber in an aqueous phase, and downstream and/or upstream homogenization of the beverage and of components used therein.

Another type of food product in which a soluble dietary fiber as described herein can be used is high solids fillings. Examples of high solids fillings in which it can be used include fillings in snack bars, toaster pastries, donuts, and cookies. The high solids filling could be an acid/fruit filling or a savory filling, for example. It could be added to products that would be consumed as is, or products that would undergo further processing, by a food processor (additional baking) or by a consumer (bake stable filling). In some embodiments, the high solids fillings would have a solids concentration between 67-90%. The solids could be entirely replaced with a soluble dietary fiber as described herein, or it could be used for a partial replacement of the other sweetener solids present (e.g., replacement of current solids from 5-100%). Typically fruit fillings would have a pH of 2-6, while savory fillings would be between 4-8 pH. Fillings could be prepared cold, or heated at up to 250° F. to evaporate to the desired finished solids content.

Another type of food product in which a soluble dietary fiber as described herein can be used is extruded and sheeted snacks. Examples of extruded and sheeted snacks in which it can be used include puffed snacks, crackers, tortilla chips, and corn chips. In preparing an extruded piece, a soluble dietary fiber as described herein (e.g., in solid form) would be added directly with the dry products. A small amount of water would be added in the extruder, and then it would pass through various zones ranging from 100° F. to 300° F. A soluble dietary fiber as described herein could be added at levels from 0-50% of the dry products mixture. A soluble dietary fiber as described herein in liquid form could also be added at one of the liquid ports along the extruder. The product would come out at either a low moisture content (5%) and then baked to remove the excess moisture, or at a slightly higher moisture content (10%) and then fried to remove moisture and cook out the product. Baking could be at temperatures up to 500° F. for 20 minutes. Baking would more typically be at 350° F. for 10 minutes. Frying would typically be at 350° F. for 2-5 minutes. In a sheeted snack, the resistant corn syrup solids could be used as a partial replacement of the other dry ingredients (e.g., flour). It could be from 0-50% of the dry weight. The product would be dry mixed, and then water added to form cohesive dough. The product mix could have a pH from 5 to 8. The dough would then be sheeted and cut and then baked or fried. Baking could be at temperatures up to 500° F. for 20 minutes. Frying would typically be at 350° F. for 2-5 minutes. Another potential benefit from the use of a soluble dietary fiber as described herein is a reduction of the fat content of fried snacks by as much as 15% when it is added as an internal ingredient or as a coating on the outside of a fried food.

Another type of food product in which a soluble dietary fiber as described herein can be used is gelatin desserts. The ingredients for gelatin desserts are often sold as a dry mix with gelatin as a gelling agent. The sugar solids could be replaced partially or entirely with a soluble dietary fiber as described herein in solid form in the dry mix. The dry mix can then be mixed with water and heated to 212° F. to dissolve the gelatin and then more water and/or fruit can be added to complete the gelatin dessert. The gelatin is then allowed to cool and set. Gelatin can also be sold in shelf stable packs. In that case the stabilizer is usually carrageenan-based. As stated above, a soluble dietary fiber as described herein can replace up to 100% of the other sweetener solids. The dry ingredients are mixed into the liquids and then pasteurized and put into cups and allowed to cool and set. The cups usually have a foil top.

Another type of food product in which a soluble dietary fiber as described herein can be used is cheese, cheese sauces, and other cheese products, as well as their dairy alternative versions. Examples of cheese, cheese sauces, and other cheese and dairy alternative products in which it can be used include lower milk solids cheese, lower fat cheese, and calorie reduced cheese. In block cheese, it can help to improve the melting characteristics, or to decrease the effect of the melt limitation added by other ingredients such as starch. It could also be used in cheese sauces, for example as a bulking agent, to replace fat, milk solids, or other typical bulking agents.

Another type of food product in which a soluble dietary fiber as described herein can be used is films that are edible and/or water soluble. Examples of films in which it can be used include films that are used to enclose dry mixes for a variety of foods and beverages that are intended to be dissolved in water, or films that are used to deliver color or flavors such as a spice film that is added to a food after cooking while still hot. Other film applications include, but are not limited to, fruit and vegetable leathers, and other flexible films.

Another type of food product in which a soluble dietary fiber as described herein can be used is soups, syrups, sauces, and dressings. A typical dressing could be from 0-50% oil, with a pH range of 2-7. It could be cold processed or heat processed. It would be mixed, and then stabilizer would be added. A soluble dietary fiber as described herein could easily be added in liquid or dry form with the other ingredients as needed. The dressing composition may need to be heated to activate the stabilizer. Typical heating conditions would be from 170-200° F. for 1-30 minutes. After cooling, the oil is added to make a pre-emulsion. The product is then emulsified using a homogenizer, colloid mill, or other high shear process.

Sauces can have from 0-10% oil and from 10-50% total solids, and can have a pH from 2-8. Sauces can be cold processed or heat processed. The ingredients are mixed and then heat processed. A soluble dietary fiber as described herein could easily be added in liquid or dry form with the other ingredients as needed. Typical heating would be from 170-200° F. for 1-30 minutes.

Soups are more typically 20-50% solids and in a more neutral pH range (4-8). They can be a dry mix, to which a soluble dietary fiber as described herein in solid form could be added, or a liquid soup which is canned and then retorted. In soups, a soluble dietary fiber as described herein could be used up to 50% solids, though a more typical usage would be to deliver 5 g of fiber/serving.

Syrups can incorporate a soluble dietary fiber as described herein as up to a 100% replacement of the sugar solids. Typically that would be 12-20% of the soluble dietary fiber on an as-is basis. A soluble dietary fiber as described herein would be added with the water and then pasteurized and hot filled to make the product safe and shelf stable (typically 185° F. for one minute pasteurization).

Another type of food product in which a soluble dietary fiber as described herein can be used is coffee creamers. Examples of coffee creamers in which it can be used include both liquid and dry creamers. A dry blended coffee creamer can be blended with commercial creamer powders of the following fat types: soybean, coconut, palm, sunflower, or canola oil, or butterfat. These fats can be non-hydrogenated or hydrogenated. A soluble dietary fiber as described herein in solid form can be added as a fiber source, optionally together with fructo-oligosaccharides, polydextrose, inulin, maltodextrin, resistant starch, sucrose, and/or conventional corn syrup solids. The composition can also contain high intensity sweeteners, such as sucralose, acesulfame potassium, aspartame, allulose, monk fruit sweeteners, steviosides or combinations thereof. These ingredients can be dry blended to produce the desired composition.

A spray dried creamer powder is a combination of fat, protein and carbohydrates, emulsifiers, emulsifying salts, sweeteners, and anti-caking agents. The fat source can be one or more of soybean, coconut, palm, sunflower, or canola oil, or butterfat. The protein can be sodium or calcium caseinates, milk proteins, whey proteins, wheat proteins, or soy proteins. The carbohydrate can be a soluble dietary fiber as described herein alone or in combination with fructo-oligosaccharides, polydextrose, inulin, resistant starch, maltodextrin, sucrose, or corn syrup. The emulsifiers can be mono- and diglycerides, acetylated mono- and diglycerides, or propylene glycol monoesters. The salts can be trisodium citrate, monosodium phosphate, disodium phosphate, trisodium phosphate, tetrasodium pyrophosphate, monopotassium phosphate, and/or dipotassium phosphate. The composition can also contain high intensity sweeteners, such as sucralose, acesulfame potassium, aspartame, or combinations thereof. Suitable anti-caking agents include sodium silicoaluminates or silica dioxides. The products are combined in slurry, optionally homogenized, and spray dried in either a granular or agglomerated form.

Liquid coffee creamers are simply a homogenized and pasteurized emulsion of fat (either dairy fat or hydrogenated vegetable oil), some milk solids or caseinates, corn syrup, and vanilla or other flavors, as well as a stabilizing blend. The product is usually pasteurized via HTST (high temperature short time) at 185° F. for 30 seconds, or UHT (ultra-high temperature), at 285° F. for 4 seconds, and homogenized in a two stage homogenizer at 500-3000 psi first stage, and 200-1000 psi second stage. The coffee creamer is usually stabilized so that it does not break down when added to the coffee.

Another type of food product in which a soluble dietary fiber as described herein can be used is food coatings such as icings, frostings, and glazes. In icings and frostings, a soluble dietary fiber as described herein can be used as a sweetener replacement (complete or partial) to lower caloric content and increase fiber content. Glazes are typically about 70-90% sugar, with most of the rest being water, and a soluble dietary fiber as described herein can be used to entirely or partially replace the sugar. Frosting typically contains about 2-40% of a liquid/solid fat combination, about 20-75% sweetener solids, color, flavor, and water. A soluble dietary fiber as described herein can be used to replace all or part of the sweetener solids, or as a bulking agent in lower fat systems.

Another type of food product in which a soluble dietary fiber as described herein can be used is pet food, such as dry or moist dog food. Pet foods are made in a variety of ways, such as extrusion, forming, and formulating as gravies. A soluble dietary fiber as described herein could be used at levels of 0-50% in each of these types.

Another type of food product in which a soluble dietary fiber as described herein can be used is tortillas, which usually contain flour and/or corn meal, fat, water, salt, and fumaric acid. A soluble dietary fiber as described herein could be used to replace flour or fat. The ingredients are mixed and then sheeted or stamped and cooked. This addition could be used to add fiber or extend the shelf life.

Another type of food product in which a soluble dietary fiber as described herein can be used is fish and meat. Conventional corn syrup is already used in some meats, so a soluble dietary fiber as described herein can be used as a partial or complete substitute. For example, a soluble dietary fiber as described herein could be added to brine before it is vacuum tumbled or injected into the meat. It could be added with salt and phosphates, and optionally with water binding ingredients such as starch, carrageenan, or soy proteins. This would be used to add fiber, a typical level would be 5 g/serving which would allow a claim of excellent source of fiber.

Another type of food product in which a soluble dietary fiber as described herein can be used is a meat analogue or meat alternative. Meat analogues and meat alternatives are food products used as meat substitutes and include plant-based ingredients. Meat analogs and meat alternatives can be formed without the use of animal-based ingredients, or alternatively can be made by combining animal-based ingredients with plant-based ingredients (e.g., proteins, fibers, and/or fats). Examples include texturized vegetable protein, tempeh, seitan and pea protein-based foods, as well as animal flesh analogs of the types made by Impossible Foods and Beyond Meat. Soluble dietary fiber as described above may be introduced as a modifier to any of flavor, texture and/or nutrition. For example, soluble dietary fiber may be added to texturized protein products to be used as ingredients in meat analogues, addition may be into the mass that is extruded to create the texturized protein, or after the mass has been extruded. Soluble dietary fiber may be added in a meat analogue with or without texturized protein, and it may be added pre- or post-extrusion of the meat analogue mass, or pre- or post-blending or mixing of ingredients in the composition, or pre- or post-processing. Soluble dietary fiber as described above may be homogenously dispersed throughout the product or concentrated in particular aspects of the product, for example in aspects intended to mimic animal-based components such as muscle meat, cartilage, connective and/or adipose tissue.

Another type of food product in which a soluble dietary fiber as described herein can be used is dried (infused) fruit. Many kinds of dried fruit are only stable and palatable if they are infused with sugar. A soluble dietary fiber as described herein can be substituted for all or part of the sugar. For example, a soluble dietary fiber as described herein could be added to the brine used to infuse the fruit before drying. Stabilizing agents such as sulfates can be used in this brine as well.

Another type of food product in which a soluble dietary fiber as described herein can be used is infant and toddler food. A soluble dietary fiber as described herein could be used as a replacement or a supplement to one or more conventional ingredients for such food. Because of its mild flavor and clear color, it could be added to a variety of baby foods to reduce sugar and increase fiber content. Similarly the soluble dietary fibers described herein are useful in infant formulas and growing-up milk, e.g., in combination with milk and/or a protein source such as soy protein, rice protein, pea protein or other plant-based protein.

Another type of food product in which a soluble dietary fiber as described herein can be used is batters and breadings, such as the batters and breadings for meat. This could be done by replacing all or part of the dry components of the batter and/or breading (e.g., flour type ingredients) with a soluble dietary fiber as described herein, or to use in combination with addition to the meat muscle or fried food itself. This could be used as a bulking agent, for fiber addition, or to reduce fat in the fried food.

Food products as disclosed herein can be used to help control the blood glucose concentration in mammals, such as humans, that suffer from diabetes. When the food product is consumed by the mammal, a soluble dietary fiber as described herein in the food product can cause a more moderate relative glycemic response in the bloodstream (i.e. as opposed to similar food products containing corn syrup), which can be beneficial for diabetes patients. "Control" in this context should be understood as a relative term; i.e., the glycemic response can be improved relative to that occurring when the same mammal consumes a similar food product that contains corn syrup, although the glycemic response may not necessarily be equivalent to what would be observed in a mammal that does not suffer from diabetes, or in a mammal that does not eat a food product at all.

In certain embodiments, the food product is a bar (e.g., a snack bar), for example, a meal replacement bar, a nutrition bar, a granola bar, a cereal bar, a grain bar, a protein bar or a nut bar. A soluble dietary fiber as described herein could be used in any part of the snack bars, such as in the high solids filling, the binding syrup or the particulate portion. A complete or partial replacement of sugar in the binding syrup is possible with a soluble dietary fiber as described herein. The binding syrup is typically from 50-90% solids and applied at a ratio ranging from 10% binding syrup to 90% particulates, to 70% binding syrup to 30% particulates. The binding syrup is made by heating a solution of sweeteners, bulking agents and other binders (like starch) to 160-230° F. (depending on the finished solids needed in the syrup). The binding syrup is then mixed with the particulates to coat the particulates, providing a coating throughout the matrix. A soluble dietary fiber as described herein could also be used in the particulates themselves. This could be an extruded piece, directly expanded or gun puffed. It could be used in combination with another grain ingredient, corn meal, rice flour or other similar ingredient.

Advantageously, the soluble fiber as described herein may be used as a substitute for sugar in a food product. Accordingly, in certain embodiments as otherwise described herein, the food product has at least 30% less sugar, or at least 40% less sugar, or at least 50% less sugar, or at least 60% less sugar, or at least 70% less sugar, or at least 80% less sugar, or at least 90% less sugar, or at least 95% less sugar than a food product of equal perceived sweetness made without the soluble dietary fiber. Such equal perceived sweetness can come, e.g., from sweetness of the soluble dietary fiber itself and/or sweetness from a non-sugar sweetener, e.g., a high-intensity sweetener such as those described herein.

Further description is provided with respect to the Examples, below.

EXAMPLE 1

Determination of Molecular Weight by Gel Permeation Chromatography

Samples are dissolved in GPC eluent (aqueous 0.1 N $NaNO_3$, 1 mM $NaN_3$, 0.4% methanol flow rate marker) at 50 mg in 10 g total eluent at room temperature with stirring. Solutions are filtered through 0.45 μm nylon syringe filters directly into GPC autosampler vials. All samples are injected in duplicate with 50 μL injections. GPC analysis is performed at 70° C. on two Waters Ultrahydrogel 250 Å and 150 Å, 7.8×300 mm columns plus 7.8×50 mm guard at 1.3 mL/min with aqueous 1 N $NaNO_3$, 1 mM $NaN_3$. Third order regression fit is applied to flow marker corrected retention time versus log M from a series of narrow standard pullulans ranging from 180 to 404,000 Da. Results are reported as pullulan equivalent molecular weight.

EXAMPLE 2

Spray Drying of Soluble Dietary Fibers

Figure 2A:
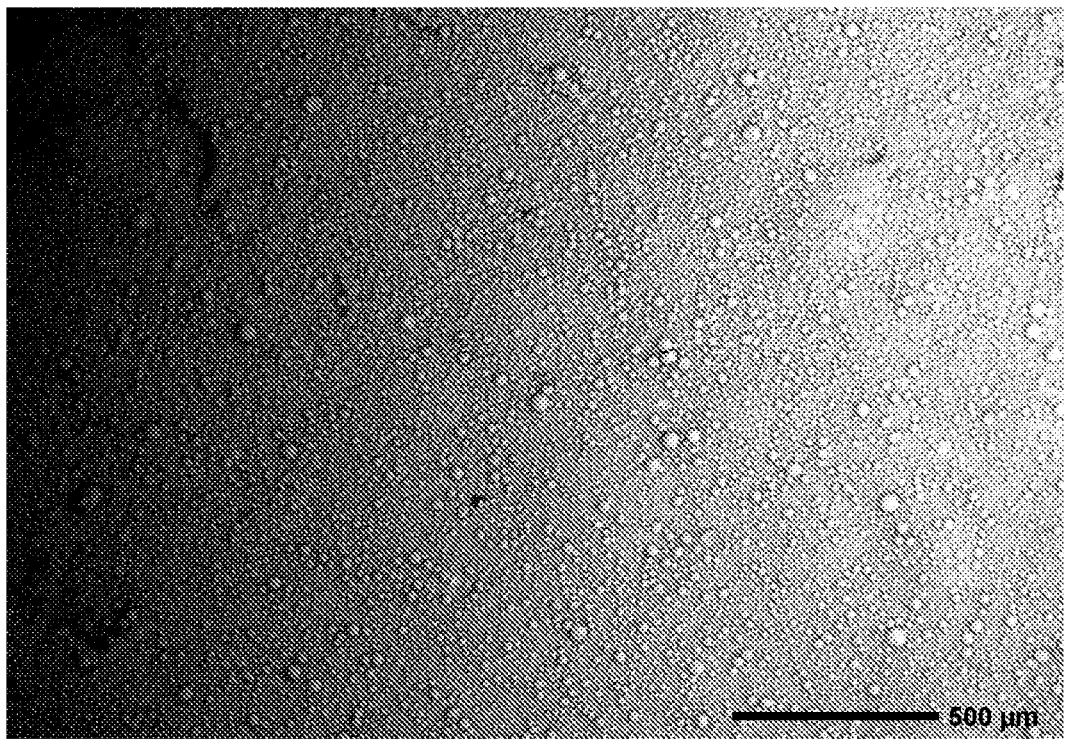
FIGS. 2A, 2B and 2C are scanning electron micrographs of Sample 1 as described in Example 2 at ×50 (2A), ×200 (2B), and ×500 (2C)
Figure 2B:
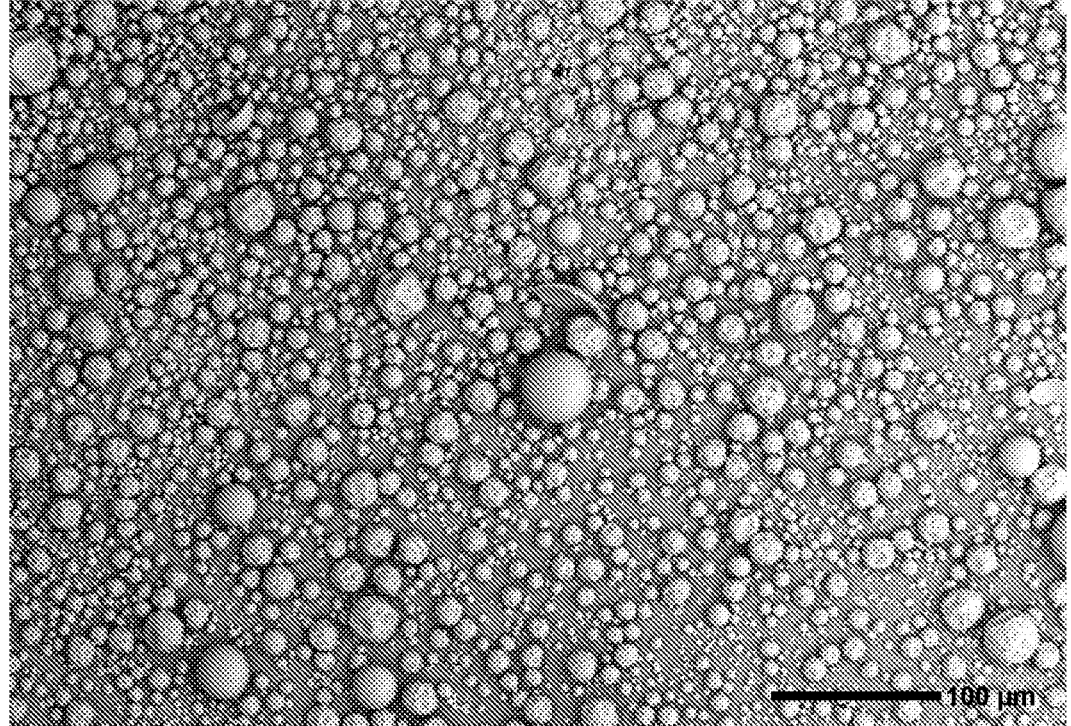
Figure 2C:
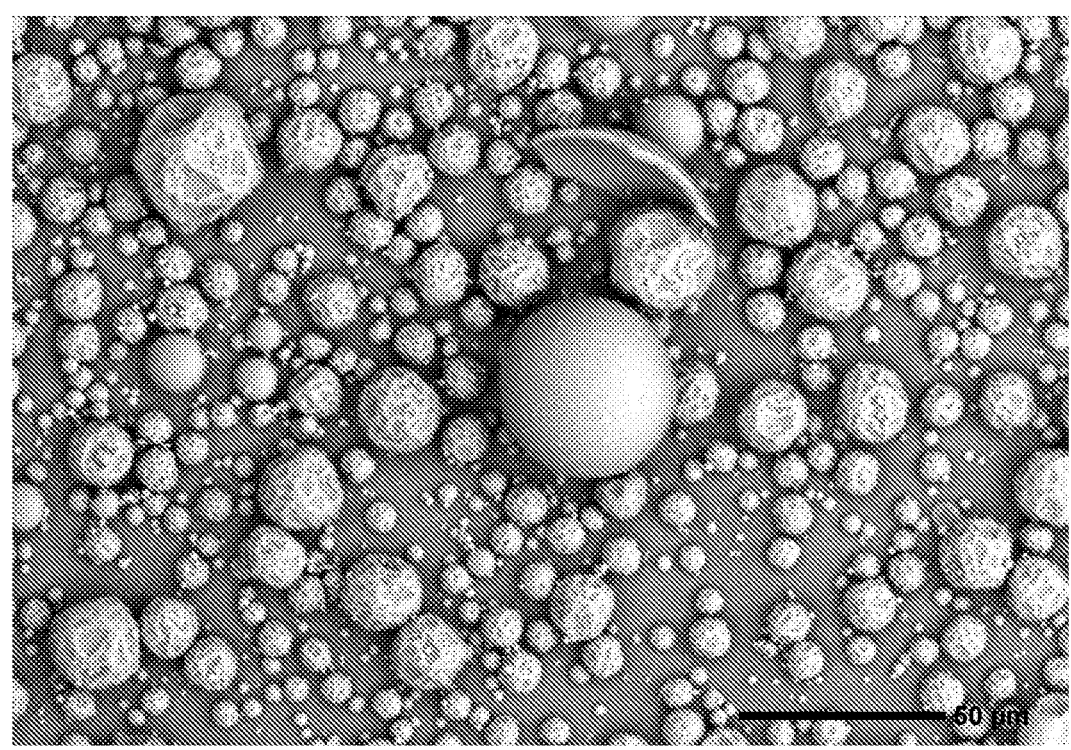
Figure 3A:
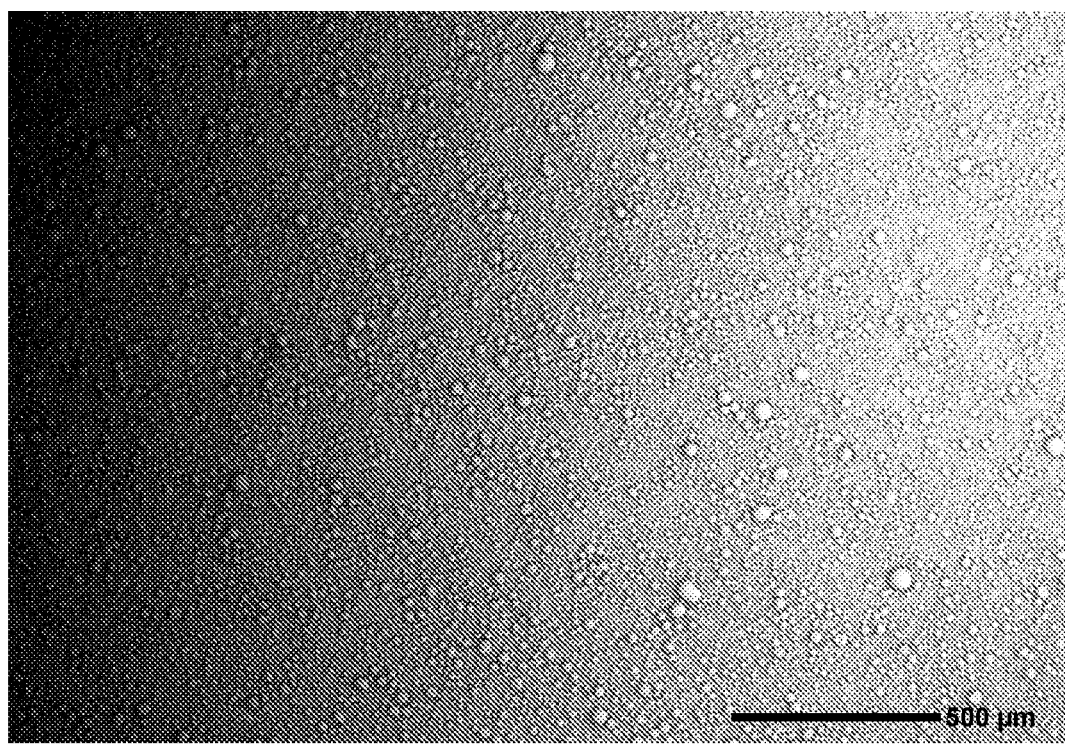
FIGS. 3A, 3B and 3C are scanning electron micrographs of Sample 2 as described in Example 2 at ×50 (3A), ×200 (3B), and ×500 (3C)
Figure 3B:
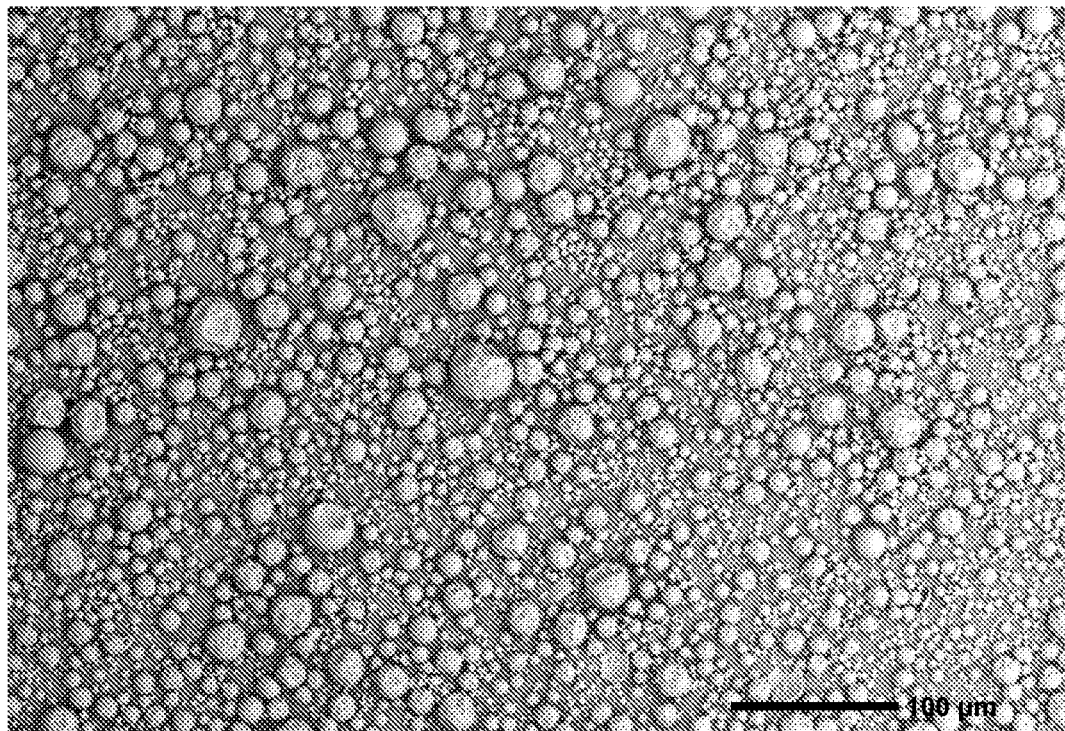
Figure 3C:
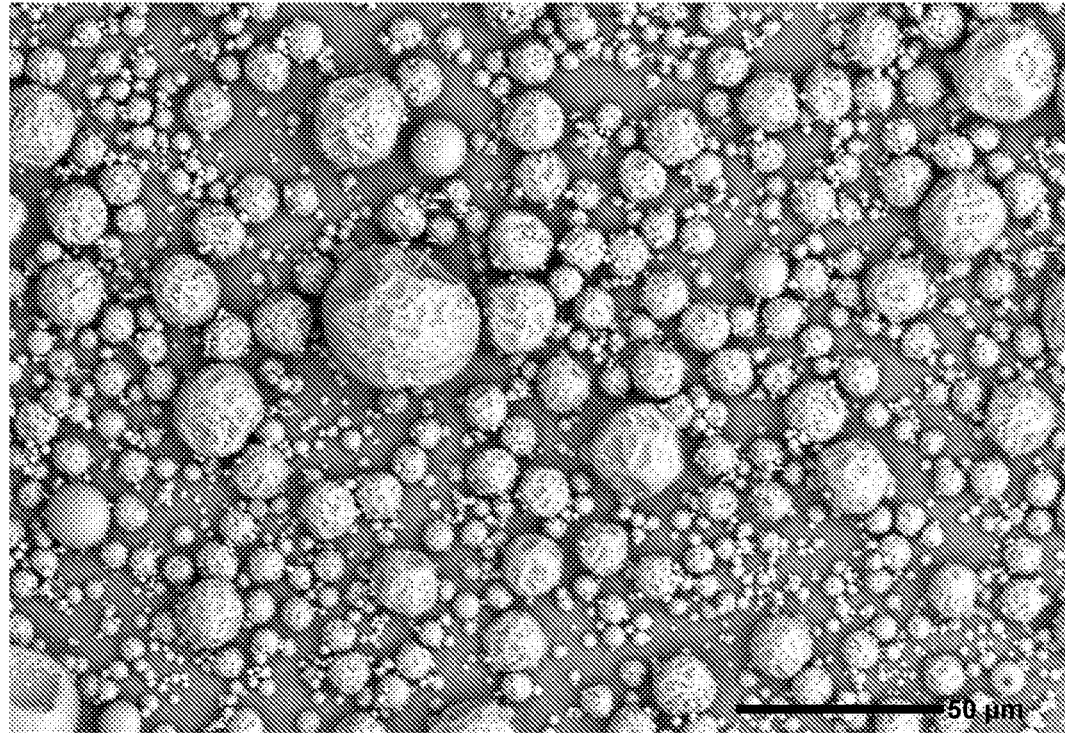
Figure 4A:
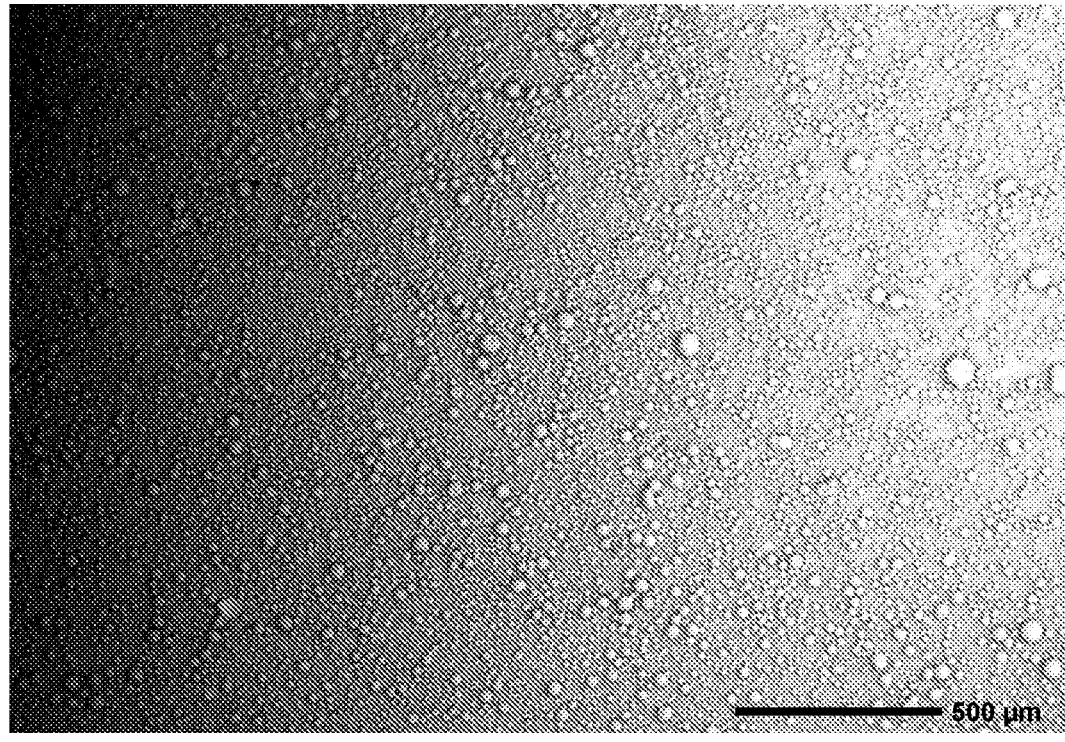
FIGS. 4A, 4B and 4C are scanning electron micrographs of Sample 3 as described in Example 2 at ×50 (4A), ×200 (4B), and ×500 (4C)
Figure 4B:
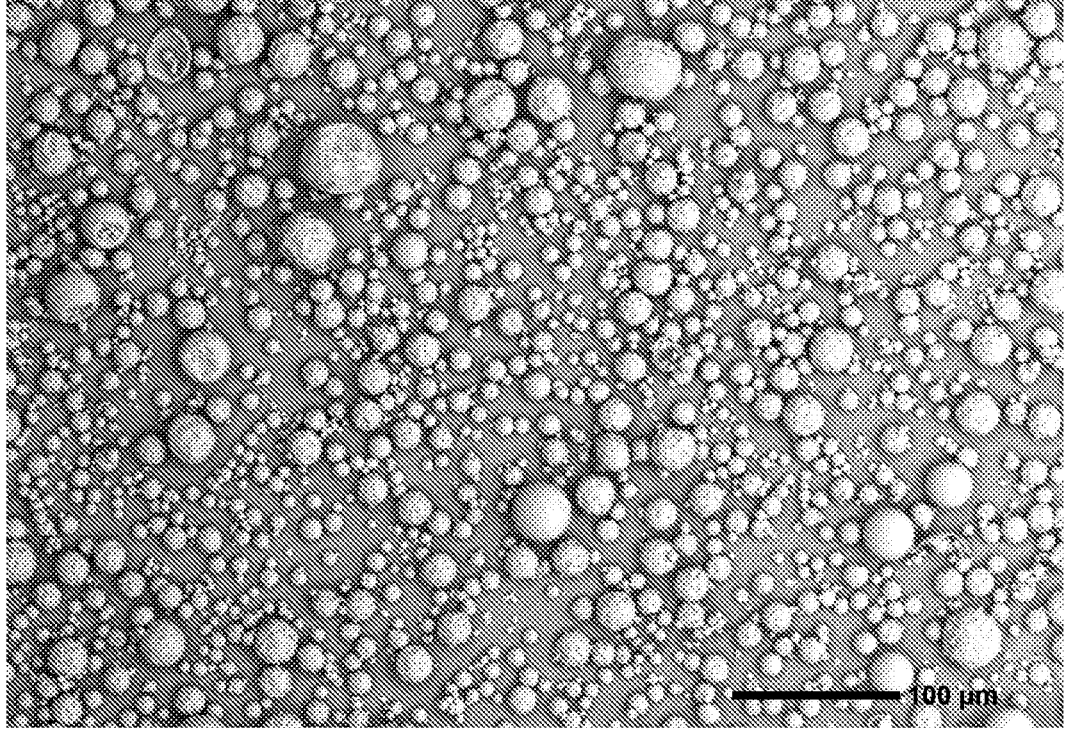
Figure 4C:
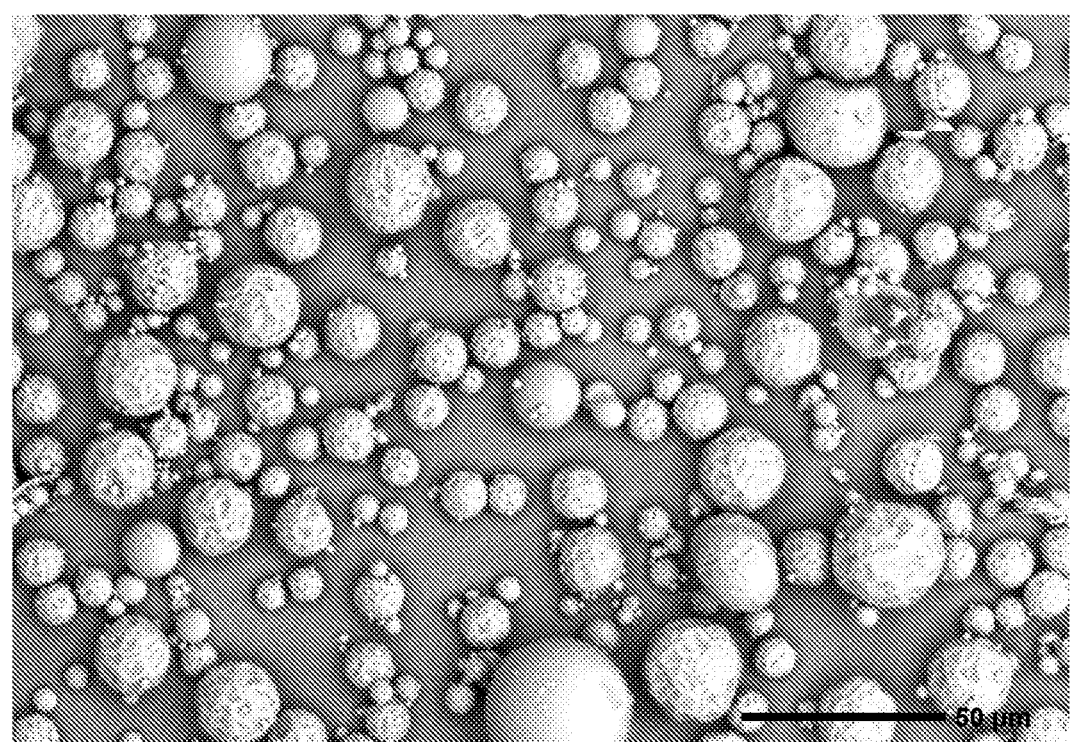
Figure 5A:
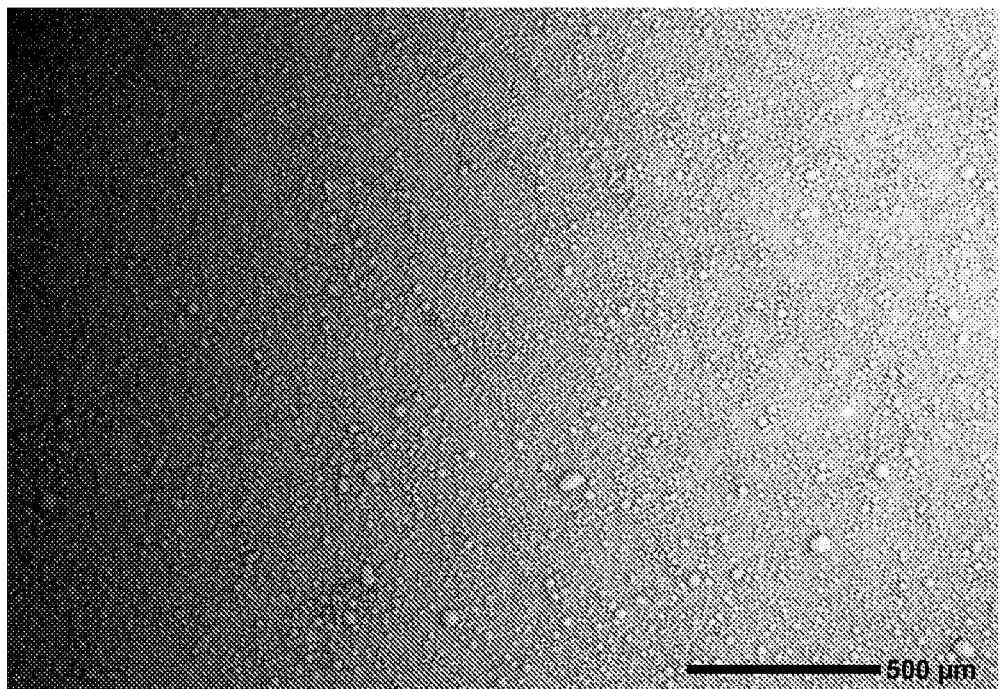
FIGS. 5A, 5B and 5C are scanning electron micrographs of Sample 4 as described in Example 2 at ×50 (5A), ×200 (5B), and ×500 (5C).
Figure 5B:
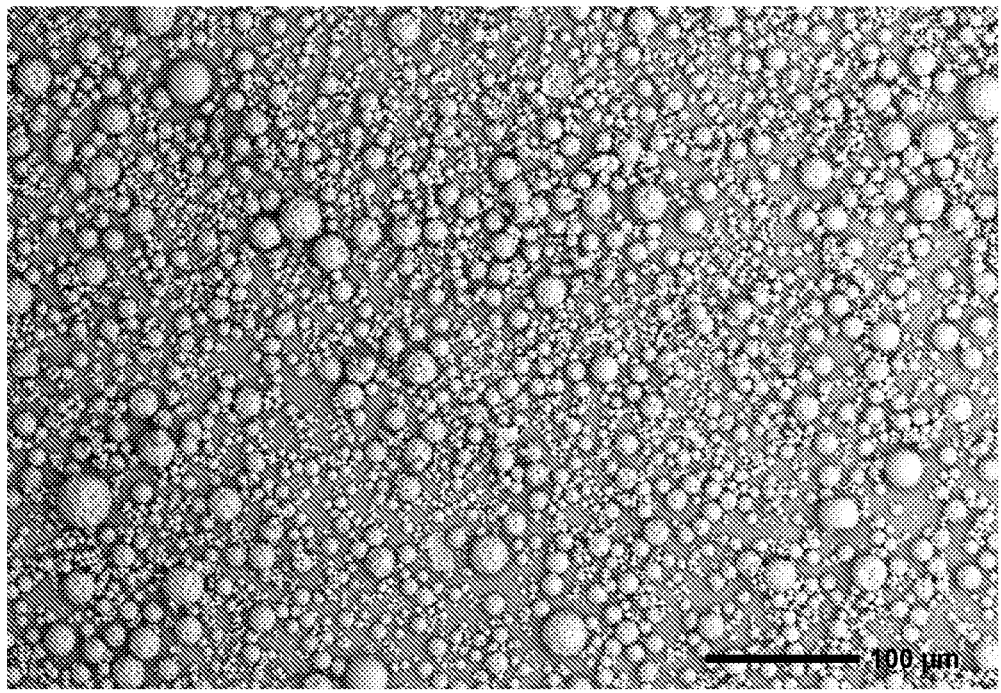
Figure 5C:
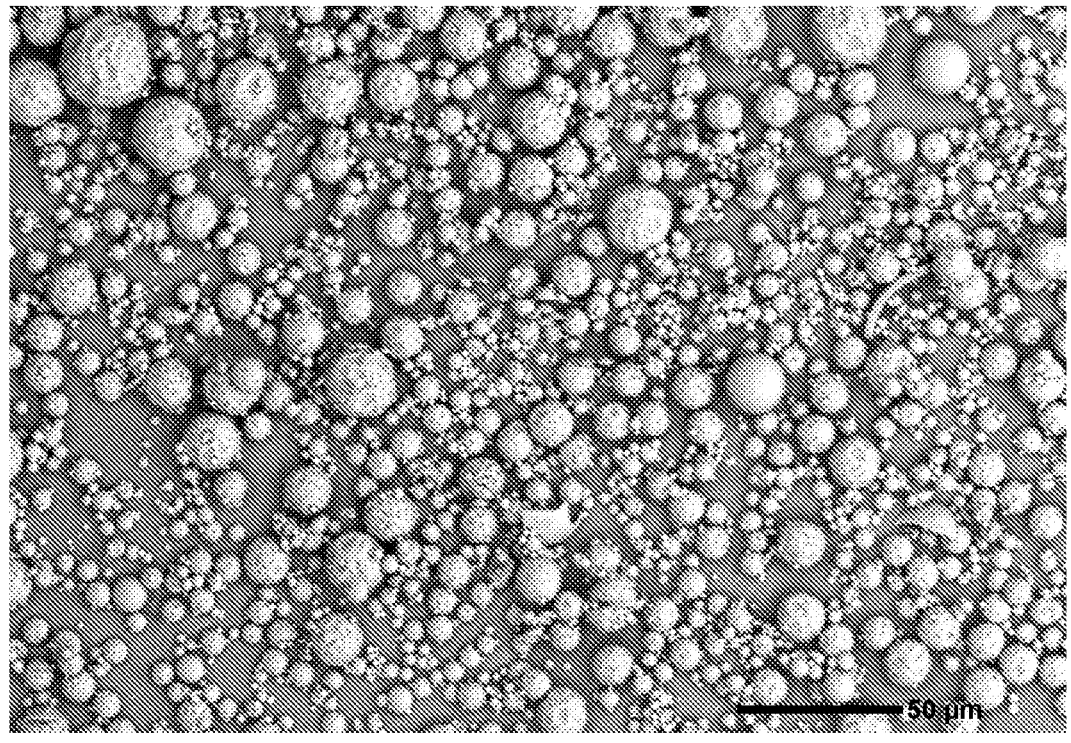

Soluble dietary fiber having less than 2% sugar (i.e., mono- and disaccharides); a first soluble dietary fiber having 15-20% sugar (A); and a second soluble dietary fiber having 15-20% sugar (B) were spray dried using a Buchi B-290 Mini Sprayer. The commercial fibers were formed into solutions with dissolved solids ranging from 20% to 30%. After spray drying, moisture levels were determined by comparing measured weights before and after baking in a 100° C. drying oven at 100 mm Hg for four hours. Morphology was determined by imaging on a JEOL JSM-6010LA analytical scanning electron microscope at ×50, ×200, and ×500 magnifications under low vacuum. Particle size and particle size distribution was determined using a Laser Diffraction Particle Size Analyzer (LS 13 320 from Beckman Coulter) equipped with a powder module. Key parameters for spray drying can be found in Table 1, and the results of analytical testing of powders can be found in Table 2. FIGS. 2A, 2B and 2C are scanning electron micrographs of Sample 1 at ×50 (2A), ×200 (2B), and ×500 (2C); FIGS. 3A, 3B and 3C are scanning electron micrographs of Sample 2 at ×50 (3A), ×200 (3B), and ×500 (3C); FIGS. 4A, 4B and 4C are scanning electron micrographs of Sample 3 at ×50 (4A), ×200 (4B), and ×500 (4C); and FIGS. 5A, 5B and 5C are scanning electron micrographs of Sample 4 at ×50 (5A), ×200 (5B), and ×500 (5C).

TABLE 1

| Sample ID | Feed Fiber | Nozzle Tip | % Dry Solids | Inlet Temp | Outlet Temp | Yield |
|---|---|---|---|---|---|---|
| Sample 1 | <2% sugars | 1.4 mm | 20% | 143° C. | 86° C. | Not Determined |
| Sample 2 | <2% sugars | 1.4 mm | 30% | 139° C. | 93° C. | 54.2% |
| Sample 3 | 15-20% sugars (A) | 1.4 mm | 30% | 135° C. | 88° C. | 37.7% |
| Sample 4 | 15-20% sugars (B) | 1.4 mm | 30% | 135° C. | 86° C. | 61.7% |

TABLE 2

| Sample ID | Feed Fiber | d10 | d50 | d90 | Moisture | Morphology |
|-----------|-----------|-----|-----|-----|----------|-----------|
| Sample 1 | <2% sugars | 5.50 µm | 13.85 µm | 27.9 µm | 4.09% | Spherical |
| Sample 2 | <2% sugars | 4.65 µm | 13.23 µm | 28.0 µm | 3.45% | Spherical |
| Sample 3 | 15-20% sugars (A) | 6.20 µm | 15.81 µm | 31.0 µm | 3.24% | Spherical |
| Sample 4 | 15-20% sugars (B) | 3.73 µm | 11.38 µm | 25.1 µm | 2.74% | Spherical |

FIG. 1 is a graph depicting the measured particle size distribution for the soluble dietary fibers.

Notably, the commercial soluble dietary fibers were successfully spray dried to provide soluble dietary fibers in particulate form with small particle size and narrow particle size distribution. This was true even for the products of numerical designation "70," which have low glass transition temperatures (e.g., 65-75° C.). The materials had low moisture content (2.7-4.1 wt %), lower than similar particulate commercial products, and so can be used in confectionary processes using conventional conching process conditions. Advantageously, the low moisture content also tends to increase the glass transition temperature of soluble dietary fibers which allows them to be subsequently processed, handled, or stored at higher temperatures without adverse effects.

COMPARATIVE EXAMPLE 1

Milling of Commercial Fibers to Obtain Reduced Particle Sizes

A commercial soluble dietary fiber having 15-20% mono- and disaccharides has a median particle size of 257.7 µm. Laboratory milling of this soluble dietary fiber to generate smaller particles resulted in long residence times, process overheating, and equipment failure. Milling at a pilot plant scale was accomplished using a Fitz Hammermill with three and five consecutive passes. After three passes, the particles were determined to have a particle size distribution of d10: 28.4 µm, d50: 162.6 µm, and d90: 371.6 µm. After five passes, the particles were determined to have a particle size distribution of d10: 19.7 µm, d50: 121.2 µm, and d90: 281.1 µm.

EXAMPLE 3

Spray Drying at Pilot Scale

Figure 6A:
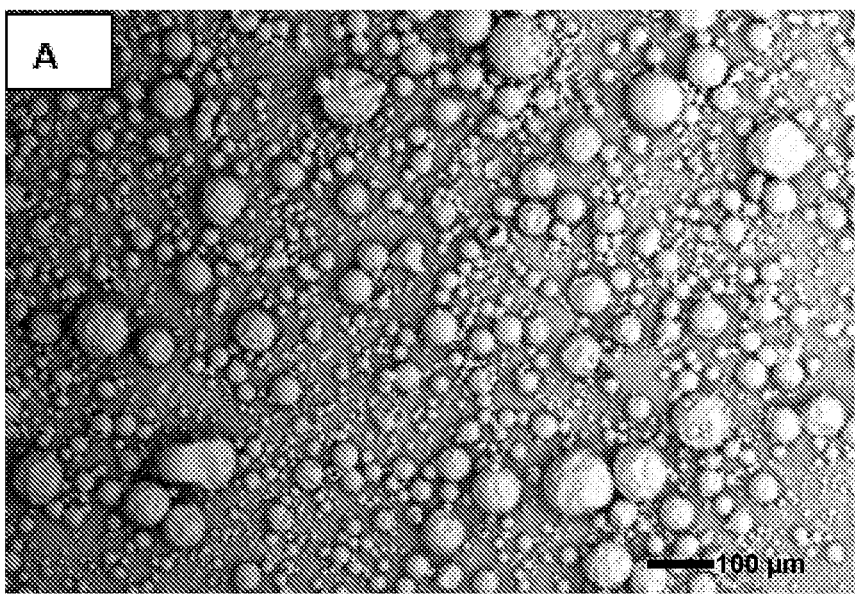
FIGS. 6A and 6B are scanning electron micrographs of the spray-dried sample of Example 3 at ×100 (6A) and ×500 (6B).
Figure 6B:
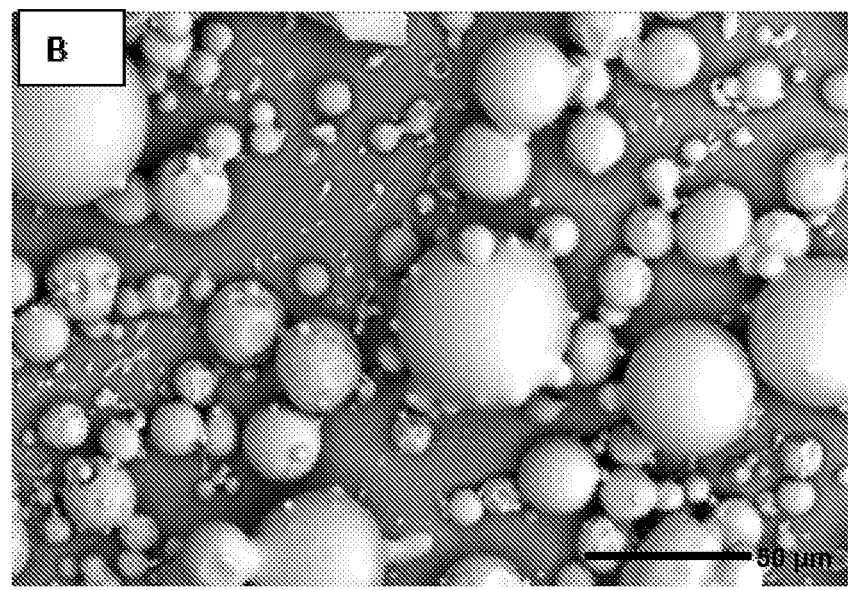

The second soluble dietary fiber having 15-20% sugar (B) was spray dried using a Niro Mobile Minor Model MM-I Spray Dryer. The commercial fiber was formed into a solution with dissolved solids of 57%. After spray drying, moisture levels were determined by comparing measured weights before and after baking in a 100° C. drying oven, 100 mmHg vacuum for four hours. Morphology was determined by imaging on a JEOL JSM-6010LA analytical scanning electron microscope at ×100, and ×500 magnifications under low vacuum. Particle size and particle size distribution was determined using a Laser Diffraction Particle Size Analyzer (LS 13 320 from Beckman Coulter) equipped with a powder module. Key parameters for spray drying can be found in Table 3, and the results of analytical testing of powders can be found in Table 4. FIGS. 6A and 6B are scanning electron micrographs of the final dried product at ×100 (6A), ×200 (6B).

TABLE 3

| Feed Fiber | % Dry Solids | Inlet Temp | Outlet Temp |
|-----------|-------------|-----------|------------|
| 15-20% sugars (B) | 57% | 180° C. | 85° C. |

TABLE 4

| Feed Fiber | d10 | d50 | d90 | Moisture | Morphology |
|-----------|-----|-----|-----|----------|-----------|
| 15-20% sugars (B) | 8.76 µm | 48.75 µm | 179.1 µm | 4.04% | Spherical |

EXAMPLE 4

Spray Drying of Soluble Dietary Fibers

Figure 7A:
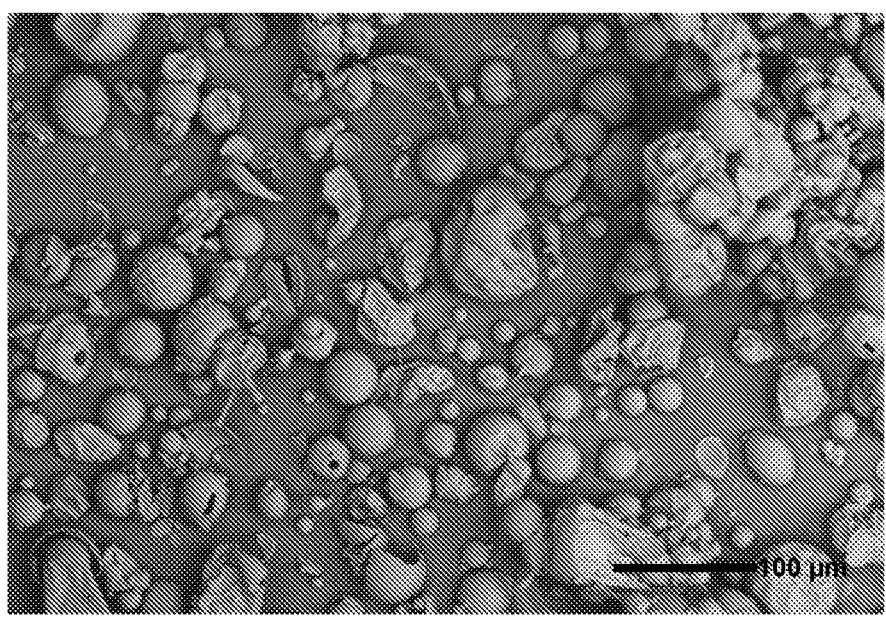
FIGS. 7A and 7B are scanning electron micrographs of the spray-dried sample of Example 4 at ×200 (7A) and ×600 (7B).
Figure 7B:
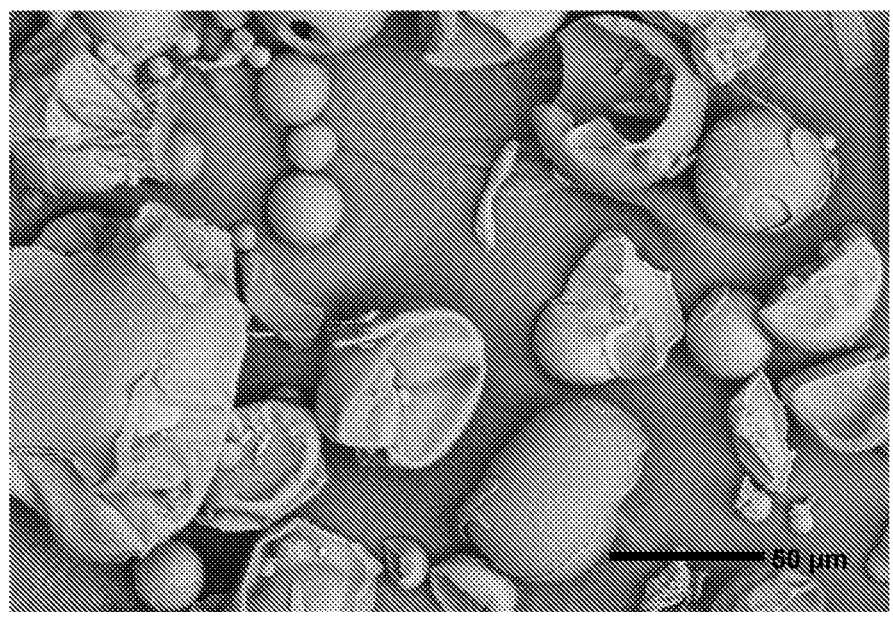

Soluble dietary fiber having 15-20% sugar was spray dried from aqueous solution having a dissolved solids content in the range of 50% to 60%. After spray drying, moisture levels were determined by comparing measured weights before and after heating in a 105° C. drying oven at 100 mm Hg for four hours. Morphology was determined by imaging on a JEOL JSM-6010LA analytical scanning electron microscope at ×200, and ×600 magnifications under low vacuum. Particle size and particle size distribution was determined using a Laser Diffraction Particle Size Analyzer (LS 13 320 from Beckman Coulter) equipped with a powder module. Key parameters for spray drying as well as the resulting product moisture, can be found in Table 5. Results on particle size analyses of the resulting powder ingredient can be found in Table 6. FIGS. 7A and 7B are scanning electron micrographs of this sample at ×200 (1A) and at ×600 (1B), respectively.

TABLE 5

| % Dry Solids | Inlet Temp | Outlet Temp | Moisture (%) | Yield (%) |
|-------------|-----------|------------|-------------|-----------|
| 58% | 196° C. | 110° C. | 1.05 | 86 |

TABLE 6

| | |
|---|---|
| Mean (µm): | 76.2 |
| Median (µm): | 71.6 |
| d10 (µm): | 23.9 |
| d50 (µm): | 71.6 |
| d90 (µm): | 136.5 |

EXAMPLE 5

Spray Drying of Soluble Dietary Fibers

Soluble dietary fiber having 15-20% sugar was spray dried from aqueous solution having a dissolved solids con-

US 12,690,605 B2

Figure 8A:
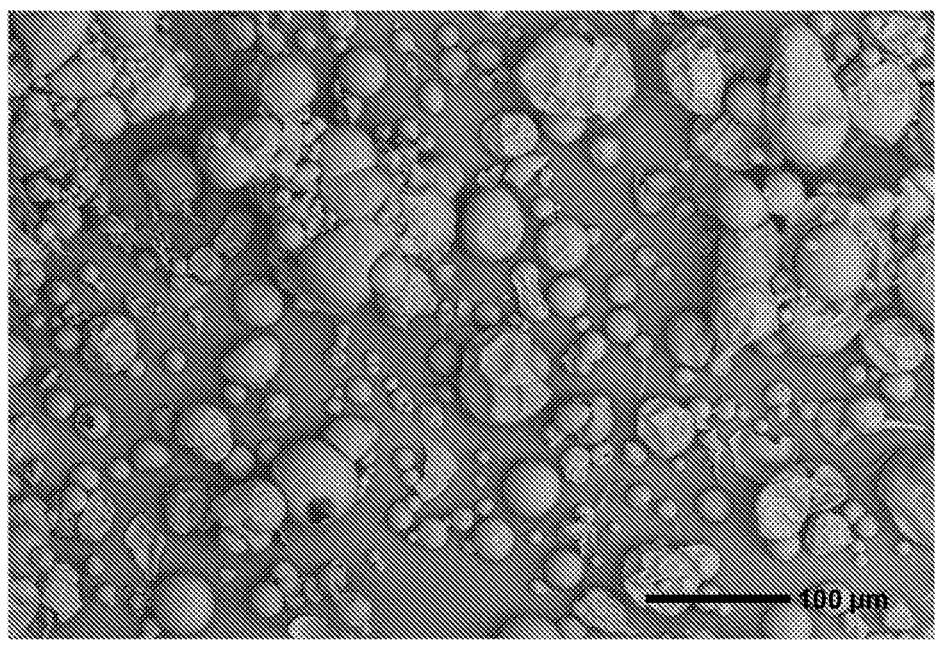
FIGS. 8A and 8B are scanning electron micrographs of the spray-dried sample of Example 5 at ×200 (7A) and ×600 (7B).
Figure 8B:
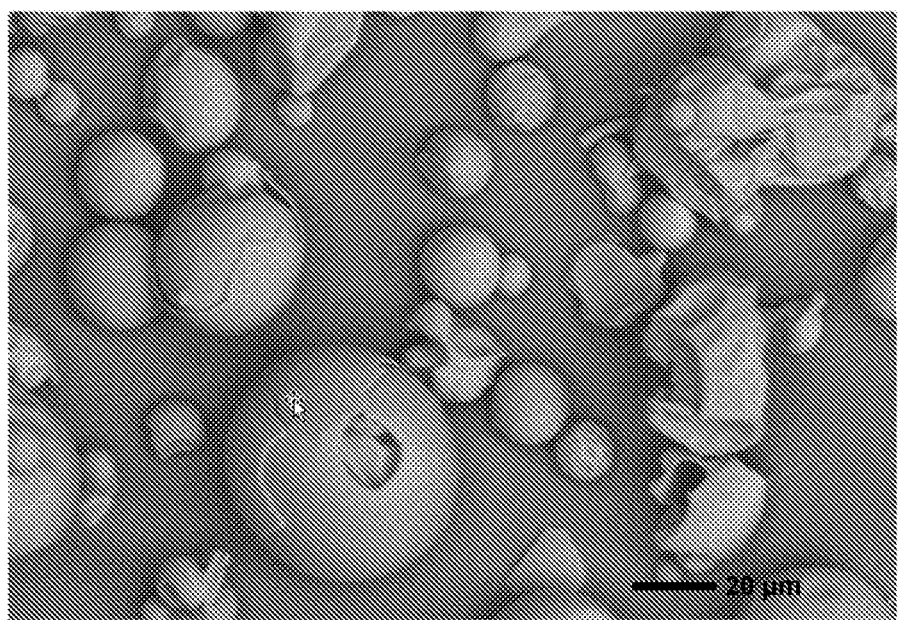

31 tent in the range of 50% to 60%. After spray drying, moisture levels were determined by comparing measured weights before and after heating in a 105° C. drying oven at 100 mm Hg for four hours. Morphology was determined by imaging on a JEOL JSM-6010LA analytical scanning electron microscope at ×200, and ×600 magnifications under low vacuum. Particle size and particle size distribution was determined using a Laser Diffraction Particle Size Analyzer (LS 13 320 from Beckman Coulter) equipped with a powder module. Key parameters for spray drying as well as the resulting product moisture, can be found in Table 7. Results on particle size analyses of the resulting powder ingredient can be found in Table 8. FIGS. 8A and 8B are scanning electron micrographs of this sample at ×200 (2A) and at ×600 (2B), respectively.

TABLE 7

| % Dry Solids | Inlet Temp | Outlet Temp | Moisture (%) | Yield (%) |
|---|---|---|---|---|
| 58% | 168° C. | 93° C. | 1.44 | 86 |

TABLE 8

| Mean (μm): | 84.2 |
|---|---|
| Median (μm): | 80.4 |
| d10 (μm): | 27.5 |
| d50 (μm): | 80.4 |
| d90 (μm): | 147.4 |

EXAMPLE 6

Spray Drying of Soluble Dietary Fibers

Figure 9A:
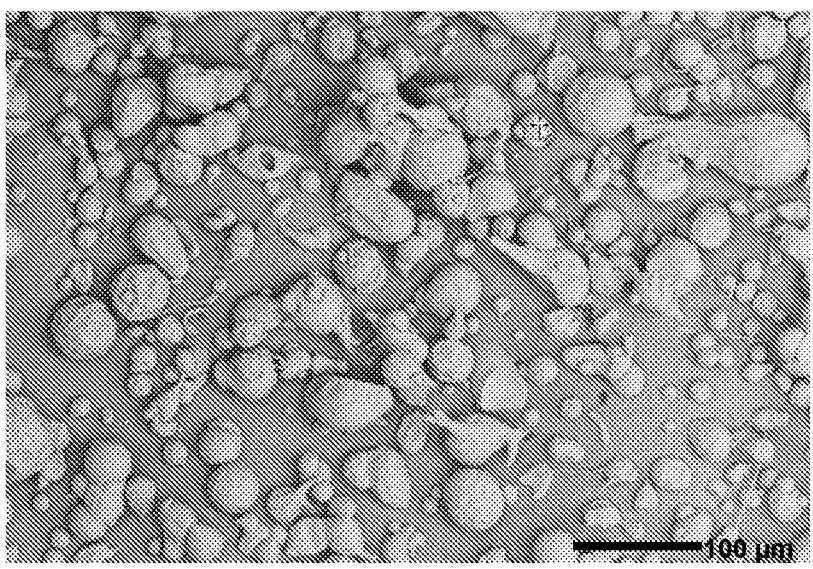
FIGS. 9A and 9B are scanning electron micrographs of the spray-dried sample of Example 6 at ×200 (8A) and ×600 (8B).
Figure 9B:
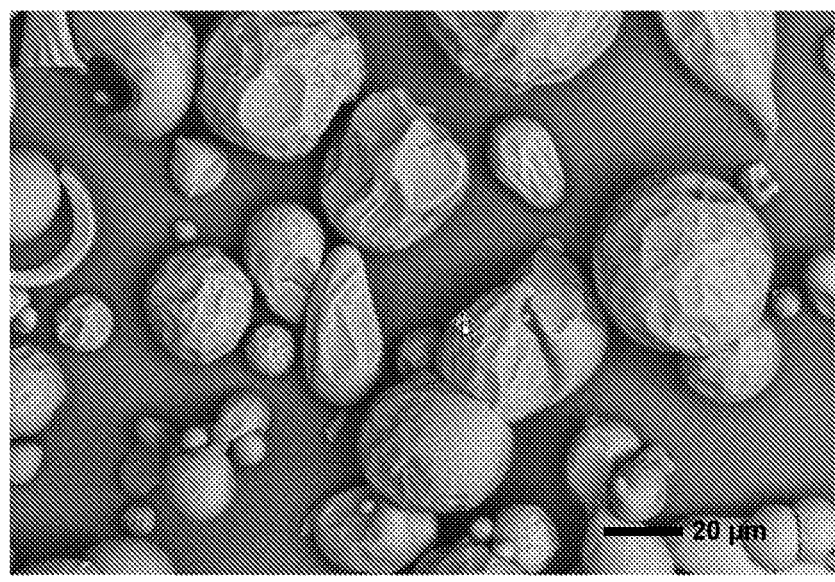

Soluble dietary fiber having 15-20% sugar was spray dried. The commercial fiber was formed into an aqueous solution with dissolved solids ranging from 50% to 60%. After spray drying, moisture levels were determined by comparing measured weights before and after heating in a 105° C. drying oven at 100 mm Hg for four hours. Morphology was determined by imaging on a JEOL JSM-6010LA analytical scanning electron microscope at ×200, and ×600 magnifications under low vacuum. Particle size and particle size distribution was determined using a Laser Diffraction Particle Size Analyzer (LS 13 320 from Beckman Coulter) equipped with a powder module. Key parameters for spray drying as well as the resulting product moisture, can be found in Table 9. Results on particle size analyses of the resulting powder ingredient can be found in Table 10. FIGS. 9A and 9B are scanning electron micrographs of this sample at ×200 (9A) and at ×600 (9B), respectively.

TABLE 9

| % Dry Solids | Inlet Temp | Outlet Temp | Moisture (%) | Yield (%) |
|---|---|---|---|---|
| 58% | 157° C. | 89° C. | 3.56 | 86 |

32

TABLE 10

| Mean (μm): | 76.1 |
|---|---|
| Median (μm): | 71.0 |
| d10 (μm): | 24.3 |
| d50 (μm): | 71.7 |
| d90 (μm): | 135.3 |

The disclosure further provides the following enumerated embodiments, which can be combined in any combination and in any number that is not logically or technically inconsistent.

Embodiment 1. A soluble dietary fiber in particulate form, having a d10 of no more than 40 μm (e.g., in the range of 1 μm to 40 μm), a d50 in the range of 5 μm to 110 μm, and a d90 in the range of 20 μm to 200 μm.

Embodiment 2. The soluble dietary fiber according to embodiment 1, having a d10 of no more than 30 μm (e.g., in the range of 1 μm to 35 μm), a d50 in the range of 5 μm to 100 μm, and a d90 in the range of 20 μm to 175 μm.

Embodiment 3. The soluble dietary fiber according to embodiment 1, having a d10 of no more than 30 μm (e.g., in the range of 1 μm to 30 μm), a d50 in the range of 5 μm to 95 μm, and a d90 in the range of 20 μm to 160 μm.

Embodiment 4. A soluble dietary fiber according to embodiment 1, having a d10 of no more than 30 μm (e.g., in the range of 1 μm to 30 μm), a d50 in the range of 5 μm to 80 μm, and a d90 in the range of 20 μm to 180 μm.

Embodiment 5. The soluble dietary fiber according to embodiment 1, having a d10 of no more than 30 μm (e.g., in the range of 1 μm to 30 μm), a d50 in the range of 5 μm to 60 μm, and a d90 in the range of 20 μm to 100 μm.

Embodiment 6. The soluble dietary fiber according to embodiment 1, having a d10 in the range of 15 μm to 35 μm (e.g., 20 μm to 30 μm), a d50 in the range of 60 μm to 95 μm (e.g., 65 μm to 90 μm) and a d90 in the range of 100 μm to 175 μm (e.g., 125 μm to 160 μm).

Embodiment 7. The soluble dietary fiber according to embodiment 1, having a d10 of no more than 35 μm, e.g., no more than 30 μm, or no more than 25 μm.

Embodiment 8. The soluble dietary fiber according to embodiment 1, having a d10 of no more than 20 μm, e.g., no more than 15 μm, or no more than 10 μm.

Embodiment 9. The soluble dietary fiber according to embodiment 1, wherein the d10 is in the range of 1 μm to 35 μm, e.g., 1 μm to 30 μm, or 2 μm to 26 μm.

Embodiment 10. The soluble dietary fiber according to embodiment 1, wherein the d10 is in the range of 3 μm to 24 μm, e.g., 6 μm to 14 μm.

Embodiment 11. The soluble dietary fiber according to embodiment 1, wherein the d10 is in the range of 14 μm to 30 μm, or 20 μm to 40 μm.

Embodiment 12. The soluble dietary fiber according to embodiment 1, wherein the d10 is in the range of 1 μm to 20 μm, or 1 μm to 15 μm, or 1 μm to 10 μm, or 1 μm to 5 μm, or 3 μm to 40 μm, or 3 μm to 35 μm, or 3 μm to 30 μm, or 3 μm to 25 μm, or 3 μm to 15 μm, or 3 μm to 10 μm, or 5 μm to 40 μm, or 5 μm to 35 μm, or 5 μm to 30 μm, or 5 μm to 25 μm, or 5 μm to 15 μm, or 5 μm to 10 μm, or 10 μm to 40 μm, or 10 μm to 35 μm, or 10 μm to 30 μm, or 10 μm to 25 μm, or 10 μm to 20 μm, or 15 μm to 40 μm, or 15 μm to 35 μm, or 15 μm to 30 μm, or 15 μm to 30 μm, or 20 μm to 40 μm, or 20 μm to 35 μm, or 20 μm to 30 μm.

Embodiment 13. The soluble dietary fiber according to any of embodiments 1 and 7-12, wherein the d50 is in the range 10 μm to 100 μm.

Embodiment 14. The soluble dietary fiber according to any of embodiments 1 and 7-12, wherein the d50 is in the range of 15 μm to 95 μm.

Embodiment 15. The soluble dietary fiber according to any of embodiments 1 and 7-12, wherein the d50 is in the range of 16 μm to 40 μm, or 40 μm to 70 μm or 70 μm to 95 μm.

Embodiment 16. The soluble dietary fiber according to any of embodiments 1 and 7-12, wherein the d50 is in the range of 5 μm to 100 μm, or 5 μm to 95 μm, or 5 μm to 90 μm, or 5 μm to 70 μm, or 5 μm to 60 μm, or 5 μm to 45 μm, or 5 μm to 30 μm, or 5 μm to 25 μm, or 5 μm to 15 μm, or 8 μm to 100 μm, or 8 μm to 95 μm, or 8 μm to 90 μm, or 8 μm to 80 μm, or 8 μm to 70 μm, or 8 μm to 60 μm, or 8 μm to 45 μm, or 8 μm to 30 μm, or 8 μm to 25 μm, or 8 μm to 15 μm, or 10 μm to 100 μm, or 10 μm to 95 μm, or 10 μm to 90 μm, or 10 μm to 80 μm, or 10 μm to 70 μm, or 10 μm to 60 μm, or 10 μm to 45 μm, or 10 μm to 30 μm, or 10 μm to 25 μm, or 15 μm to 80 μm, or 15 μm to 70 μm, or 15 μm to 60 μm, or 15 μm to 100 μm, or 15 μm to 95 μm, or 15 μm to 90 μm, or 15 μm to 45 μm, or 15 μm to 30 μm, or 15 μm to 25 μm, or 25 μm to 100 μm, or 25 μm to 95 μm, or 25 μm to 90 μm, or 25 μm to 80 μm, or 25 μm to 70 μm, or 25 μm to 60 μm, or 25 μm to 45 μm, or 35 μm to 100 μm, or 35 μm to 95 μm, or 35 μm to 90 μm, or 35 μm to 80 μm, or 35 μm to 70 μm, or 35 μm to 60 μm, or 45 μm to 110 μm, or 45 μm to 100 μm, or 15 μm to 95 μm, or 15 μm to 90 μm, or 45 μm to 80 μm, or 45 μm to 70 μm, or 45 μm to 60 μm, or 55 μm to 110 μm, or 55 μm to 100 μm, or 55 μm to 95 μm, or 55 μm to 90 μm, or 55 μm to 80 μm, or 55 μm to 70 μm or 70 μm to 110 μm, or 70 μm to 100 μm, or 70 μm to 95 μm, or 70 μm to 90 μm.

Embodiment 17. The soluble dietary fiber according to any of embodiments 1 and 7-16, wherein the d90 is in the range of 20 μm to 175 μm, e.g., 20 μm to 160 μm.

Embodiment 18. The soluble dietary fiber according to any of embodiments 1 and 7-16, wherein the d90 is in the range of 20 μm to 35 μm.

Embodiment 19. The soluble dietary fiber according to any of embodiments 1 and 7-16, wherein the d90 is in the range of 100 μm to 200 μm.

Embodiment 20. The soluble dietary fiber according to any of embodiments 1 and 7-16, wherein the d90 is in the range of 20 μm to 180 μm, or 20 μm to 160 μm, or 20 μm to 140 μm, or 20 μm to 120 μm, or 20 μm to 100 μm, or 20 μm to 80 μm, or 20 μm to 60 μm, or 20 μm to 40 μm, or 30 μm to 200 μm, or 30 μm to 180 μm, or 30 μm to 160 μm, or 30 μm to 140 μm, or 30 μm to 120 μm, or 30 μm to 100 μm, or 30 μm to 80 μm, or 30 μm to 60 μm, or 50 μm to 200 μm, or 50 μm to 180 μm, or 50 μm to 160 μm, or 50 μm to 140 μm, or 50 μm to 120 μm, or 50 μm to 100 μm, or 50 μm to 80 μm, or 80 μm to 180 μm, or 80 μm to 200 μm, or 80 μm to 180 μm, or 80 μm to 160 μm, or 80 μm to 140 μm, or 80 μm to 120 μm, or 100 μm to 200 μm, or 100 μm to 180 μm, or 100 μm to 160 μm, or 100 μm or 140 μm, or 100 μm to 120 μm, or 120 μm to 200 μm, or 120 μm to 180 μm, or 120 μm to 160 μm.

Embodiment 21. The soluble dietary fiber according to embodiment 1, wherein the d10 is no more than 35 μm (e.g., in the range of 1 μm to 35 μm), the d50 is in the range of 5 μm to 100 μm, and the d90 is in the range of 20 μm to 175 μm.

Embodiment 22. The soluble dietary fiber according to embodiment 1, wherein the d10 is in the range of 15 μm to 35 μm (e.g., 20 μm to 30 μm), the d50 is in the range of 60 μm to 95 μm (e.g., 65 μm to 90 μm), and the d90 is in the range of 100 μm to 175 μm (e.g., 125 μm to 160 μm).

Embodiment 23. The soluble dietary fiber according to embodiment 1, wherein the d10 is no more than 30 μm (e.g., in the range of 1 μm to 30 μm), the d50 is in the range of 5 μm to 80 μm, and the d90 is in the range of 20 μm to 180 μm.

Embodiment 24. The soluble dietary fiber according to embodiment 1, wherein the d10 is no more than 30 μm (e.g., in the range of 1 μm to 30 μm), the d50 is in the range of 5 μm to 60 μm, and the d90 is in the range of 20 μm to 100 μm.

Embodiment 25. The soluble dietary fiber according to any of embodiments 1-24, wherein the d10 value is at least 12.5% of the d50 value, and/or wherein the d90 value is no more than 800% of the d50 value Embodiment 26. The soluble dietary fiber according to any of embodiments 1-24, wherein the d10 value is at least 25% of the d50 value, and/or wherein the d90 value is no more than 400% of the d50 value.

Embodiment 27. The soluble dietary fiber according to any of embodiments 1-26, having a moisture content of no more than 10 wt %, e.g., no more than 8 wt %, or no more than 6 wt %.

Embodiment 28. The soluble dietary fiber according to any of embodiments 1-27, having a moisture content of at least 0.5 wt %, e.g., at least 1 wt %, at least 2 wt %, or at least 2.5 wt %.

Embodiment 29. The soluble dietary fiber according to any of embodiments 1-26, having a moisture content in the range of 0.5-10 wt %, e.g., 0.5-8 wt %, or 0.5-6 wt % or 0.5-5 wt %.

Embodiment 30. The soluble dietary fiber according to any of embodiments 1-26, having a moisture content in the range of 1-10 wt %, e.g., 1-8 wt %, or 1-6 wt %, or 1-5 wt %.

Embodiment 31. The soluble dietary fiber according to any of embodiments 1-26, having a moisture content in the range of 2-10 wt %, e.g., 2-8 wt %, or 2-6 wt %, or 2-5 wt %.

Embodiment 32. The soluble dietary fiber according to any of embodiments 1-26, having a moisture content in the range of 2.5-10 wt %, e.g., 2.5-8 wt %, or 2.5-6 wt %, or 2.5-5 wt %.

Embodiment 33. The soluble dietary fiber according to any of embodiments 1-26, having a moisture content in the range of 3-10 wt %, e.g., 3-8 wt %, or 3-6 wt %, or 3-5 wt %.

Embodiment 34. The soluble dietary fiber according to any of embodiments 1-26, having a moisture content in the range of 3.5-10 wt %, e.g., 3.5-8 wt %, or 3.5-6 wt %, or 3.5-5 wt %.

Embodiment 35. The soluble dietary fiber according to any of embodiments 1-26, having a moisture content in the range of 4-10 wt %, e.g., 4-8 wt %, or 4-6 wt %, or 4-5 wt %.

Embodiment 36. The soluble dietary fiber according to any of embodiments 1-35, having a weight-average molecular weight in the range of 1000 g/mol to 2500 g/mol.

Embodiment 37. The soluble dietary fiber according to any of embodiments 1-35, having a weight-average molecular weight in the range of 1000 g/mol to 2000 g/mol.

Embodiment 38. The soluble dietary fiber according to any of embodiments 1-37, having a glass transition temperature in the range of 50° C. to 100° C. when measured at 95% solids.

Embodiment 39. The soluble dietary fiber according to any of embodiments 1-37, having a glass transition temperature in the range of 55° C. to 100° C., e.g., 60° C. to 100° C., or 65° C. to 100° C., when measured at 95% solids.

Embodiment 40. The soluble dietary fiber according to any of embodiments 1-37, having a glass transition temperature in the range of 50° C. to 95° C., e.g., 55° C. to 95° C., or 60° C. to 95° C., or 65° C. to 95° C., when measured at 95% solids.

Embodiment 41. The soluble dietary fiber according to any of embodiments 1-37, having a glass transition temperature in the range of 50° C. to 90° C., or 55° C. to 90° C., or 60° C. to 90° C., or 65° C. to 90° C. when measured at 95% solids.

Embodiment 42. The soluble dietary fiber according to any of embodiments 1-37, having a glass transition temperature in the range of 50° C. to 85° C., or 55° C. to 85° C., or 60° C. to 85° C., or 65° C. to 85° C. when measured at 95% solids Embodiment 43. The soluble dietary fiber according to any of embodiments 1-42, having a total amount of mono- and disaccharides of up to 25 wt %, e.g., up to 20 wt %, on a dry solids basis.

Embodiment 44. The soluble dietary fiber according to any of embodiments 1-42, having a total amount of mono- and disaccharides of no more than 15 wt %, e.g., no more than 10 wt %, on a dry solids basis.

Embodiment 45. The soluble dietary fiber according to any of embodiments 1-42, having a total amount of mono- and disaccharides in the range of 10 wt % to 25 wt %, e.g., 10 wt % to 20 wt %, or 12 wt % to 20 wt %, or 15 wt % to 25 wt %, on a dry solids basis.

Embodiment 46. The soluble dietary fiber according to any of embodiments 1-45, having a linkage pattern comprising:
25-45% terminally-linked glucopyranosyl residues;
10-22% 6-linked glucopyranosyl residues;
13-32% 4-linked glucopyranosyl residues;
2-11% 3-linked glucopyranosyl residues;
3-13% 4,6-linked glucopyranosyl residues;
1-5% 3,6-linked glucopyranosyl residues; and
0.5-4% 2,4-linked glucopyranosyl residues.

Embodiment 47. The soluble dietary fiber according to any of embodiments 1-45, having a linkage pattern comprising:
29-45% terminally-linked glucopyranosyl residues;
10-22% 6-linked glucopyranosyl residues;
13-27% 4-linked glucopyranosyl residues;
2-11% 3-linked glucopyranosyl residues;
3-13% 4,6-linked glucopyranosyl residues;
1-5% 3,6-linked glucopyranosyl residues; and
0.5-4% 2,4-linked glucopyranosyl residues.

Embodiment 48. The soluble dietary fiber according to any of embodiments 1-47, having a fiber content of at least 65%.

Embodiment 49. The soluble dietary fiber according to any of embodiments 1-47, having a fiber content of at least 70%, e.g., at least 75%, at least 80%, or even at least 85%.

Embodiment 50. The soluble dietary fiber according to any of embodiments 1-47, having a fiber content of at least 90%, e.g., at least 95% or even at least 98%.

Embodiment 51. The soluble dietary fiber according to any of embodiments 1-43, having a fiber content in the range of 65% to 85%, e.g., in the range of 65% to 80%, or in the range of 65% to 75%.

Embodiment 52. The soluble dietary fiber according to any of embodiments 1-47, having a fiber content in the range of 70% to 100%, e.g., in the range of in the range of 70% to 99%, or 70% to 98%, or 70% to 95%, or 70% to 90%, or 70% to 85%, or 70% to 80%.

Embodiment 53. The soluble dietary fiber according to any of embodiments 1-47, having a fiber content in the range of 85% to 100%, e.g., 85% to 99%, or 85% to 98%, or 85% to 95%.

Embodiment 54. The soluble dietary fiber according to any of embodiments 1-49, wherein the soluble dietary fiber is made by a process comprising:
providing a saccharide feed comprising at least 95 wt % (e.g., at least 97 wt %, at least 98 wt % or at least 99 wt %) on a dry solids basis of dextrose and/or dextrose oligomers;
reacting the saccharide feed in the presence of water and in the substantial absence of sugar alcohols at a total solids concentration of at least about 80% by weight and a temperature of at least about 120° C. with at least one acid catalyst that accelerates the rate of cleavage and formation of glucosyl bonds for a time sufficient to produce a product composition having a fiber content of at least 60% fiber.

Embodiment 55. The soluble dietary fiber according to any of embodiments 1-54 wherein the particulate form has a substantially spherical morphology.

Embodiment 56. A method for making the soluble dietary fiber according to any of embodiments 1-55, the method comprising:
providing an aqueous solution of a soluble dietary fiber feed, and
drying the aqueous solution to provide the soluble dietary fiber in particulate form.

Embodiment 57. The method according to embodiment 56, wherein the drying is a spray drying.

Embodiment 58. The method according to embodiment 56, wherein the spray drying includes steam-assisted atomization.

Embodiment 59. A method for making the soluble dietary fiber according to any of embodiments 1-55, the method comprising providing a soluble dietary fiber feed in solid form, and processing the soluble dietary fiber feed to provide the soluble dietary fiber in particulate form.

Embodiment 60. The method according to embodiment 59, wherein the processing is via a technique selected from air-classifying milling, jet milling (e.g., fluidized bed jet milling), ball milling and sphere micronization.

Embodiment 61. The method according to embodiment 59 or embodiment 60, wherein the soluble dietary fiber feed is made by cooling of a low-moisture level liquid soluble dietary fiber.

Embodiment 62. The method according to embodiment 61, wherein the low-moisture level liquid soluble dietary fiber is made by evaporating a liquid soluble dietary fiber.

Embodiment 63. A soluble dietary fiber made by the method of any of embodiments 56-62.

Embodiment 64. A method for making a food product, the method comprising:

providing a soluble dietary fiber according to any of embodiments 1-55 and 63, and combining the soluble dietary fiber with one or more other food ingredients.

Embodiment 65. A food product comprising a soluble dietary fiber according to any of embodiments 1-55 and 63.

Embodiment 66. The method or food product according to embodiment 64 or embodiment 65, wherein the soluble dietary fiber is disposed in a phase of the food product having no more than 3.5% water, e.g., having no more than 3.0 wt % water, or no more than 2.5 wt % water.

Embodiment 67. The method or food product according to embodiment 64 or embodiment 65, wherein the soluble dietary fiber is disposed in a phase of the food product having no more than 2 wt % water, e.g., having no more than 1.5 wt % water.

Embodiment 68. The method or food product according to embodiment 64 or embodiment 65, wherein the soluble dietary fiber is disposed in a phase of the food product having no more than 3.5% water, e.g., having no more than 3.0 wt % water, or no more than 2.5 wt % water.

Embodiment 69. The method or food product according to embodiment 64 or embodiment 65, wherein the soluble dietary fiber is disposed in a phase of the food product having no more than 2 wt % water, e.g., having no more than 1.5 wt % water.

Embodiment 70. The method or food product according to any of embodiments 64-69, wherein the soluble dietary fiber is not dissolved in the food product.

Embodiment 71. The method or food product according to any of embodiments 64-69, wherein the fiber is dispersed in a lipid phase of a food matrix.

Embodiment 72. The method or food product according to embodiment 71, wherein the food product is a chocolate, confectionary composition, or cream filling.

Embodiment 73. The method or food product according to embodiment 72, wherein the chocolate, confectionary composition or cream filling is part of a candy, a bar (e.g., energy bar, snack bar, breakfast bar, protein bar), a frozen dessert or a baked good.

Embodiment 74. The method or food product according to embodiment 73, wherein the food product is a chocolate, e.g., milk chocolate, bittersweet chocolate, dark chocolate, white chocolate, or flavored chocolate Embodiment 75. The method or food product according to embodiment 73, wherein the food product is a confectionary composition, e.g., chocolate flavored or otherwise flavored.

Embodiment 76. The method or food product according to embodiment 73, wherein the food product is a chocolate filling, e.g., disposed within a chocolate shell, or in other examples inside a baked good, such as a cookie, a pastry or a cake.

Embodiment 77. The method or food product according to any of embodiments 64-74, wherein the food product is a fatty spread, e.g., a highly sweetened spread such as sweetened hazelnut spreads (e.g., NUTELLA); a milk-based spread, a chocolate-based spread, or a nut-based spread such as peanut butter, almond butter and cashew butter.

Embodiment 78. The method or food product according to any of embodiments 64-74, wherein the food product is selected from chewing gum (which includes sugarized gum, sugar-free gum, functional gum and bubble gum), centerfill confections, medicated confectionery, lozenges, tablets, pastilles, mints, standard mints, power mints, chewy candies, hard candies, boiled candies, breath and other oral care films or strips, candy canes, lollipops, gummies, jellies, wine gums, fudge, caramel, hard and soft panned goods, toffee, taffy, liquorice, gelatin candies, gum drops, jelly beans, nougats, and fondants.

Embodiment 79. The method or food product according to any of embodiments 64-74, wherein the food product is a dry mix, e.g., for a beverage, such as a fruit beverage, a protein beverage, a meal replacement, a milk such as an infant formula or a growing-up milk, or a milk modifier, or for a batter, a pudding, a soup, a gravy, or a sauce.

Embodiment 80. The method or food product according to any of embodiments 64-80, wherein the soluble dietary fiber is incorporated in the food product without substantial particle size reduction.

Embodiment 81. The method according to embodiment 80, wherein the soluble dietary fiber is dispersed in (e.g., dissolved in) an aqueous phase of the food product.

Embodiment 82. The method according to embodiment 81, wherein the food product is a beverage such as a fruit beverage, a protein beverage, a meal replacement, or a milk such as an infant formula or a growing-up milk.

Embodiment 83. The method according to embodiment 81, wherein the food product is a batter, a pudding, a soup, a gravy, or a sauce.

Embodiment 84. The method according to any of embodiments 81-83, wherein the aqueous phase has at least 10% water, e.g., at least 20% water, at least 30% water, or at least 50% water.

Embodiment 85. The method according to any of embodiments 81-83, wherein the aqueous phase has 10-99.8% water, e.g., or 20-99.8% water, or 30-99.8% water, or 40-99.8% water.

Embodiment 86. The method according to any of embodiments 81-83, wherein the aqueous phase is the only substantial phase of the food product (e.g. makes up at least 98% of the food product).

What is claimed is:

1. The soluble dietary fiber in particulate form, having a d10 of no more than 40 μm, a d50 in the range of 5 μm to 100 μm, and a d90 in the range of 20 μm to 200 μm, and having a linkage pattern comprising:

25-45% terminally-linked glucopyranosyl residues;

10-22% 6-linked glucopyranosyl residues;

13-32% 4-linked glucopyranosyl residues;

2-11% 3-linked glucopyranosyl residues;

3-13% 4,6-linked glucopyranosyl residues;

1-5% 3,6-linked glucopyranosyl residues; and 0.5-4% 2,4-linked glucopyranosyl residues;

wherein the total amount of dextrose oligomers and dextrose in the soluble dietary fiber is at least 95% by weight, on a dry solids basis; and wherein the d10 value is at least 25% of the d50 value, and/or wherein the d90 value is no more than 400% of the d50 value.

2. The soluble dietary fiber according to claim 1, wherein the d10 is no more than 30 μm, the d50 is in the range of 5 μm to 95 μm, and the d90 is in the range of 20 μm to 100 μm.

3. The soluble dietary fiber according to claim 1, wherein the d10 is no more than 30 μm, the d50 is in the range of 5 μm to 60 μm, and the d90 is in the range of 20 μm to 100 μm.

4. The soluble dietary fiber according to claim 1, having a moisture content in the range of 0.5-6 wt %.

5. The soluble dietary fiber according to claim 1, having a weight-average molecular weight in the range of 1000 g/mol to 2500 g/mol.

6. The soluble dietary fiber according to claim 1, having a glass transition temperature in the range of 50° C. to 100° C. when measured at 95% solids.

7. The soluble dietary fiber according to claim 1, having a total amount of mono-and disaccharides up to 25 wt % on a dry solids basis.

8. The soluble dietary fiber according to claim 1, having a linkage pattern comprising:
   29-45% terminally-linked glucopyranosyl residues;
   10-22% 6-linked glucopyranosyl residues;
   13-27% 4-linked glucopyranosyl residues;
   2-11% 3-linked glucopyranosyl residues;
   3-13% 4,6-linked glucopyranosyl residues;
   1-5% 3,6-linked glucopyranosyl residues; and
   0.5-4% 2,4-linked glucopyranosyl residues.

9. The soluble dietary fiber according to claim 1, having a fiber content of at least 65% by weight on a dry solids basis.

10. The soluble dietary fiber according to claim 1, wherein the soluble dietary fiber is made by a process comprising:
   providing a saccharide feed comprising at least 95 wt % on a dry solids basis of dextrose and/or dextrose oligomers;
   reacting the saccharide feed in the presence of water and in the substantial absence of sugar alcohols at a total solids concentration of at least about 80% by weight and a temperature of at least about 120° C. with at least one acid catalyst that accelerates the rate of cleavage and formation of glucosyl bonds for a time sufficient to produce a product composition having a fiber content of at least 60% fiber.

11. The soluble dietary fiber according to claim 1, wherein the particulate form has a substantially spherical morphology.

12. A food product comprising a soluble dietary fiber according to claim 1.

13. The food product according to claim 12, wherein the food product is a chocolate, confectionary composition, or cream filling.

14. The food product according to claim 12, wherein the food product is a fatty spread; a milk-based spread, a chocolate-based spread, or a nut-based spread such as peanut butter, almond butter and cashew butter.

15. A soluble dietary fiber in particulate form, having a d10 in the range of 10 μm to 40 μm, a d50 in the range of 15 μm to 95 μm, and a d90 in the range of 55 μm to 100 μm, wherein the d10 value is at least 33% of the d50 value, and wherein the d90 value is no more than 300% of the d50 value, the soluble dietary fiber having a fiber content of at least 65% and a linkage pattern comprising:
   25-45% terminally-linked glucopyranosyl residues;
   10-22% 6-linked glucopyranosyl residues;
   13-32% 4-linked glucopyranosyl residues;
   2-11% 3-linked glucopyranosyl residues;
   3-13% 4,6-linked glucopyranosyl residues;
   1-5% 3,6-linked glucopyranosyl residues; and
   0.5-4% 2,4-linked glucopyranosyl residues,
wherein the soluble dietary fiber is made by a process comprising:
   providing a saccharide feed comprising at least 95 wt % on a dry solids basis of dextrose and/or dextrose oligomers;
   reacting the saccharide feed in the presence of water and in the substantial absence of sugar alcohols at a total solids concentration of at least about 80% by weight and a temperature of at least about 120° C. with at least one acid catalyst that accelerates the rate of cleavage and formation of glucosyl bonds for a time sufficient to produce a product composition having a fiber content of at least 65% fiber by weight on a dry solids basis,
wherein the soluble dietary fiber has a weight-average molecular weight in the range of 1000 g/mol to 2500 g/mol, and a glass transition temperature in the range of 50° C. to 100° C. when measured at 95% solids,
wherein the particulate form is made by spray-drying and has a substantially spherical morphology, and
wherein the soluble dietary fiber in particulate form has a moisture content of no more than 6 wt %.

16. The soluble dietary fiber according to claim 15, having a moisture content in the range of 0.5-6 wt %.

17. The soluble dietary fiber according to claim 15, having a weight-average molecular weight in the range of 1000 g/mol to 2000 g/mol and a glass transition temperature in the range of 50° C. to 100° C. when measured at 95% solids.

18. The soluble dietary fiber according to claim 15, having a total amount of mono-and disaccharides up to 25 wt % on a dry solids basis and a fiber content in the range of 70% to 95% by weight on a dry solids basis.

19. The soluble dietary fiber according to claim 15, having a linkage pattern comprising:
   29-45% terminally-linked glucopyranosyl residues;
   10-22% 6-linked glucopyranosyl residues;
   13-27% 4-linked glucopyranosyl residues;
   2-11% 3-linked glucopyranosyl residues;
   3-13% 4,6-linked glucopyranosyl residues;
   1-5% 3,6-linked glucopyranosyl residues; and
   0.5-4% 2,4-linked glucopyranosyl residues.

* * * * *